(12) United States Patent
Williams

(10) Patent No.: US 8,784,031 B2
(45) Date of Patent: Jul. 22, 2014

(54) CARGO LOADER

(75) Inventor: Troy D. Williams, Kent, WA (US)

(73) Assignee: Container Stuffers, LLC, Auburn, WA (US)

( * ) Notice: Subject to any disclaimer, the term of this patent is extended or adjusted under 35 U.S.C. 154(b) by 555 days.

(21) Appl. No.: 12/651,958

(22) Filed: Jan. 4, 2010

(65) Prior Publication Data
US 2011/0164953 A1  Jul. 7, 2011

(51) Int. Cl.
*B65G 67/08* (2006.01)

(52) U.S. Cl.
USPC .......................................... 414/398; 414/400

(58) Field of Classification Search
USPC ........................ 414/373, 389, 398, 400, 572
See application file for complete search history.

(56) References Cited

U.S. PATENT DOCUMENTS

| | | | |
|---|---|---|---|
| 2,847,137 A | | 8/1958 | Stringfellow |
| 3,186,566 A | | 6/1965 | Spinanger et al. |
| 3,722,477 A | | 3/1973 | Weldy et al. |
| 3,727,777 A | | 4/1973 | Hanson |
| 3,780,893 A | | 12/1973 | Lassig |
| 3,857,501 A | | 12/1974 | Lassig |
| 3,938,678 A | * | 2/1976 | Kern ............................ 108/55.1 |
| 3,952,887 A | * | 4/1976 | Lutz ............................... 414/392 |
| 4,170,292 A | * | 10/1979 | Lang ............................. 198/746 |
| 4,181,460 A | | 1/1980 | Lutz |
| 4,195,959 A | * | 4/1980 | Schmitt ........................ 414/788.9 |
| 4,203,697 A | * | 5/1980 | Cayton ......................... 414/345 |
| 4,256,434 A | | 3/1981 | Stodt |
| 4,279,557 A | | 7/1981 | Stodt |
| 4,304,518 A | * | 12/1981 | Carder et al. ................. 414/495 |
| RE31,060 E | | 10/1982 | Lutz |
| 4,439,093 A | | 3/1984 | Victorino |
| 4,487,120 A | | 12/1984 | Barstow |
| 4,818,171 A | | 4/1989 | Burkholder |

(Continued)

FOREIGN PATENT DOCUMENTS

| | | |
|---|---|---|
| DE | 3538189 A1 | 1/1987 |
| DE | 20117346 U1 | 3/2002 |

(Continued)

OTHER PUBLICATIONS

CLS Media, http://www.containerstuffers.com/media.html (last visited Aug. 23, 2013).*

(Continued)

*Primary Examiner* — Jonathan Snelting
(74) *Attorney, Agent, or Firm* — Davis Wright Tremaine LLP; George C. Rondeau, Jr.; Heather M. Colburn

(57) ABSTRACT

A cargo loader operable to load cargo into an opening of an enclosed trailer. The loader has an elongated bed with front and rear portions. A carriage is mounted on the bed and coupled to a drive assembly operable to move the carriage between the front and rear portions. Forks are mounted on the carriage and move therewith. Cargo is loaded onto the forks when the carriage is positioned on the front portion. The opening of the trailer is positioned adjacent the rear portion so that when the carriage pushes the forks and cargo thereupon longitudinally along the bed toward the rear portion, the forks and cargo are received inside the trailer. The drive assembly moves the carriage from the rear to the front portion to withdraw the forks from inside the trailer while a cargo retention assembly maintains the cargo inside the trailer.

21 Claims, 34 Drawing Sheets

(56) References Cited

U.S. PATENT DOCUMENTS

| | | | |
|---|---|---|---|
| 4,861,220 A | 8/1989 | Smith | |
| 5,054,987 A | 10/1991 | Thornton | |
| 5,082,415 A * | 1/1992 | Hayashi | 414/343 |
| 5,186,596 A * | 2/1993 | Boucher et al. | 414/395 |
| 5,219,259 A * | 6/1993 | Cochran et al. | 414/345 |
| 5,346,352 A * | 9/1994 | Ito | 414/400 |
| 5,403,142 A * | 4/1995 | Stewart | 414/392 |
| 5,515,664 A | 5/1996 | Tanaka | |
| 5,577,873 A * | 11/1996 | Tanaka et al. | 414/400 |
| 6,006,893 A | 12/1999 | Gilmore et al. | |
| 6,056,497 A | 5/2000 | Holz | |
| 6,450,753 B1 * | 9/2002 | Hallstrom et al. | 414/400 |
| 6,799,933 B1 | 10/2004 | Wasinger et al. | |
| 7,114,909 B2 * | 10/2006 | McCrory et al. | 414/809 |
| 7,172,382 B2 | 2/2007 | Frankel | |
| 7,188,816 B2 | 3/2007 | Aoki | |
| 7,588,406 B2 | 9/2009 | Frankel | |
| 7,695,235 B1 * | 4/2010 | Rallis | 414/400 |
| 8,047,756 B2 * | 11/2011 | Tuffs et al. | 414/392 |
| 8,257,007 B2 * | 9/2012 | Williams et al. | 414/395 |
| 2007/0098531 A2 * | 5/2007 | Byrne | 414/400 |
| 2007/0140819 A1 * | 6/2007 | Piveteau et al. | 414/373 |
| 2009/0028677 A1 | 1/2009 | Williams et al. | |
| 2011/0058922 A1 * | 3/2011 | Auriemma | 414/400 |

FOREIGN PATENT DOCUMENTS

| | | |
|---|---|---|
| FR | 2867766 A1 | 9/2005 |
| GB | 2175567 A | 12/1986 |
| JP | 58-012845 | 1/1983 |
| JP | 07010293 | 1/1995 |
| JP | 07-257441 A | 10/1995 |
| JP | 7098582 B2 | 10/1995 |
| JP | 2007-119238 A | 5/2007 |
| KR | 10-0578946 B1 | 5/2006 |
| WO | 95/23105 A1 | 8/1995 |
| WO | 99/46195 A1 | 9/1999 |

OTHER PUBLICATIONS

International Patent Application No. PCT/US2008/071233 International Search Report dated Feb. 19, 2009, 3 pages.

International Patent Application No. PCT/US2011/020123: International Search Report dated Sep. 2, 2011, 6 pages.

Information Disclosure Statement Transmittal Letter filed herewith on Feb. 29, 2012, 2 pages.

Extended European Search Report received in EP Patent Application No. 08782409.0, dated Oct. 18, 2012, 8 pages.

* cited by examiner

CARGO LOADER

BACKGROUND OF THE INVENTION

1. Field of the Invention

The present invention is directed generally to cargo loaders, and more particularly to cargo loaders for loading cargo onto a trailer.

2. Description of the Related Art

Typically, a forklift is used to load cargo onto a trailer (such as a container, refrigerated trailer, dry van, flat bed, and the like) or into a box portion of a box truck. The forklift must make several trips into and out of an enclosed trailer (or the box of the box truck) to load the cargo therein. This is a time-consuming procedure and increases the cost of cargo handling. A common problem encountered by forklift operators is a damaged or deteriorated floor inside a trailer or box. Further, the forklift may damage the interior of the trailer or box with the forks or mast of the forklift. Thus, a need exists for a device for loading cargo into an enclosed trailer, a box of a box truck, or onto a flat bed trailer that avoids the problems associated with using a forklift to load the cargo. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

The present application describes several embodiments of an apparatus for loading cargo into a trailer to be pulled behind a semi-tractor. The apparatus allows an entire load to be assembled (or staged) separate and apart from the trailer and then loaded as a single unit onto the trailer.

Figure 1:
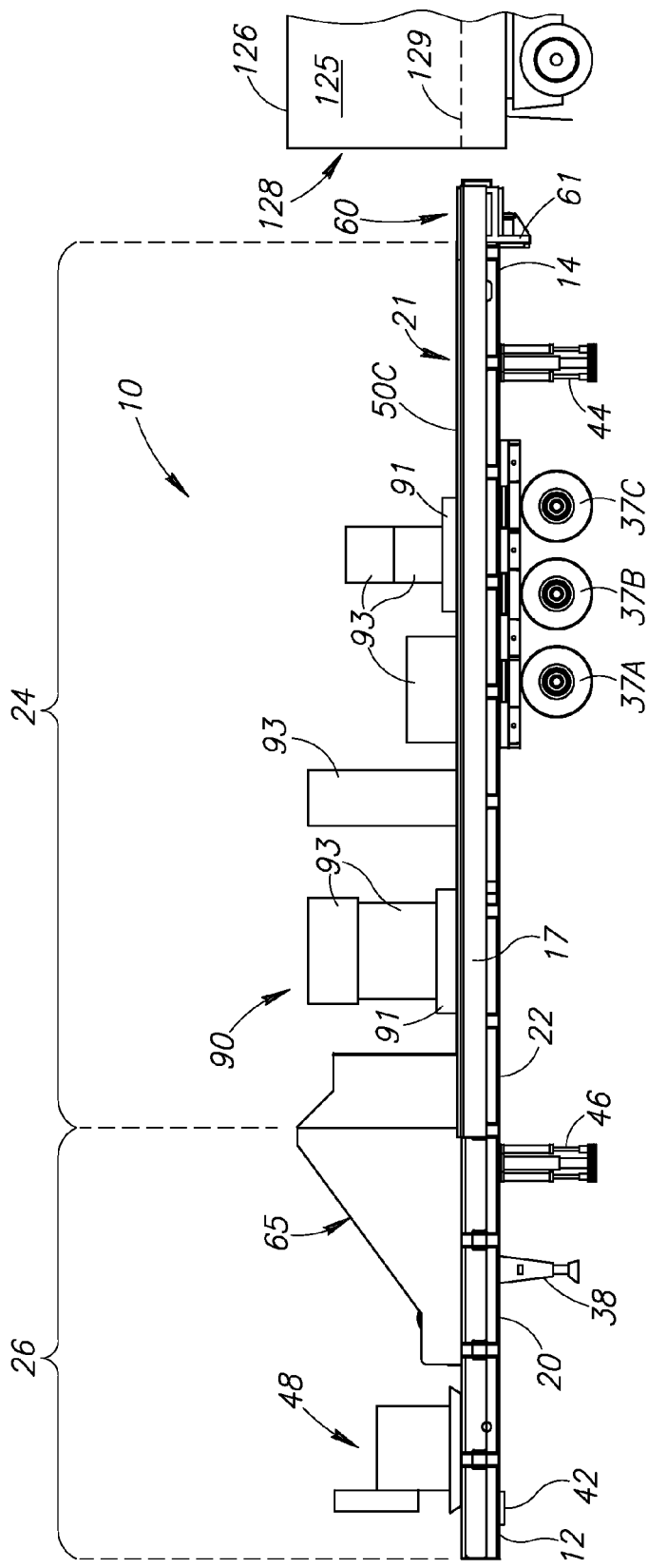
FIG. 1 is a side view of a first embodiment of a cargo loader apparatus loaded with a cargo of boxes and palletized boxes.

FIG. 1 depicts a first embodiment of an apparatus 10 for receiving a cargo 90 (e.g., pallets 91, boxes 93, and the like)

and transporting and/or loading that cargo into or onto an over-the-road trailer 125. The cargo 90 may include products that have been palletized for shipment in the trailer 125. The cargo 90 may also include non-palletized items, such as boxes, packaged items, unpackaged items, and the like. The apparatus 10 is not limited to use with any particular type of cargo.

For illustrative purposes, the trailer 125 will be described as being an enclosed trailer of the type commonly pulled by a semi-tractor. However, the trailer 125 may include any trailer, including those commonly pulled behind a semi-tractor, such as a refrigerated trailer, dry van, flat bed, and the like. Further, the trailer 125 may include a shipping container supported by an over-the-road trailer. Alternatively, the trailer 125 may include a box portion of a box truck. The trailer 125 has a rear portion 126 having a rearward facing opening 128 into which the cargo 90 may be loaded. A substantially flat bed, deck, or floor 129 configured to receive the cargo 90 from the apparatus 10 is provide inside the trailer 125. Trailers are well known in the art and will not be described in further detail herein.

Figure 2:
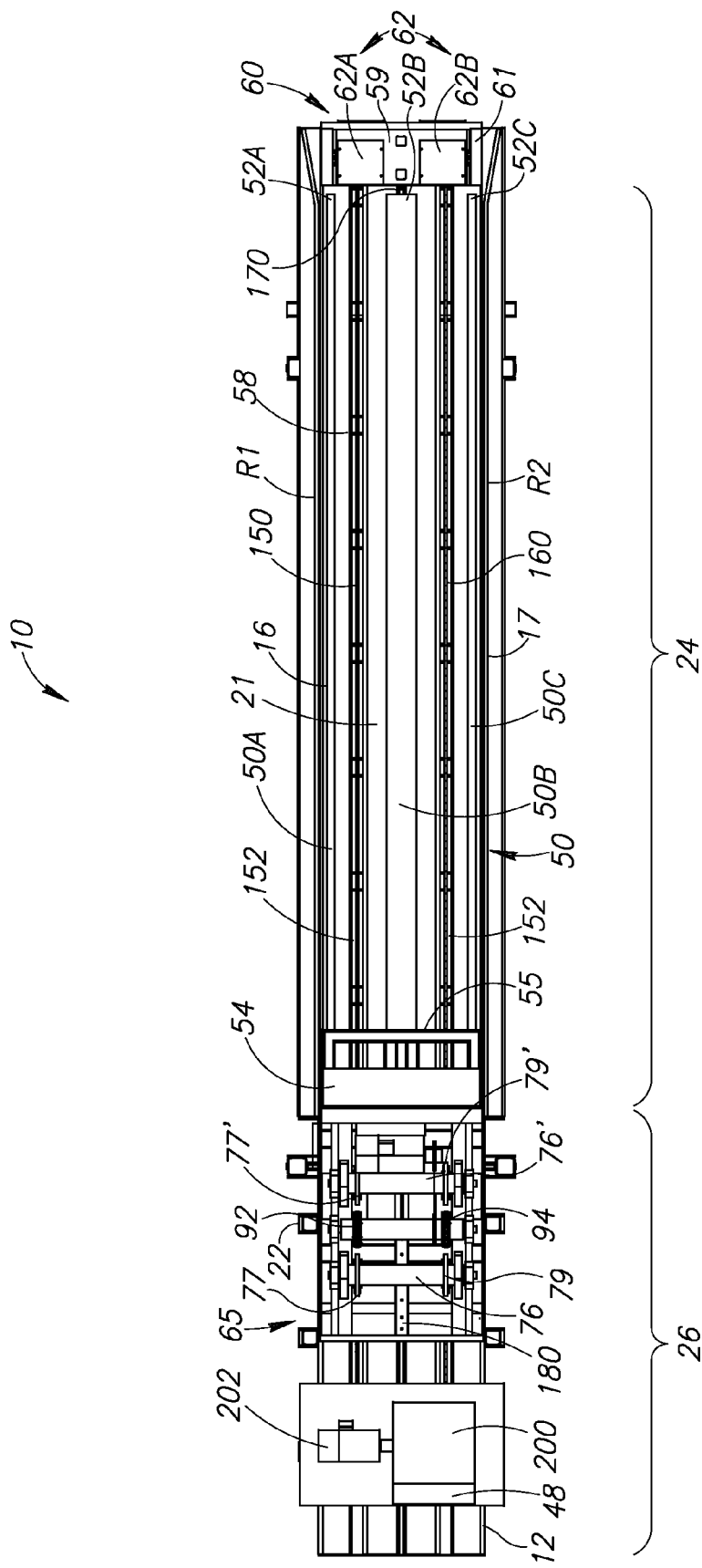
FIG. 2 is a top plan view of the cargo loader apparatus of FIG. 1 with the cargo removed.

In the embodiment depicted in the figures, the apparatus 10 includes a generally rectangular-shaped bed 21. Referring to FIG. 1, the bed 21 is supported above the ground by an elongated frame 22. Referring to FIG. 2, the bed 21 has a first longitudinal side portion 16 located opposite a second longitudinal side portion 17. The bed 21 depicted in the drawings includes a pair of longitudinally extending channels 152 flanking a longitudinally extending center channel 170.

Optionally, a first guide rail "R1" may be positioned alongside the bed 21 on the first longitudinal side portion 16 and a second guide rail "R2" may be positioned alongside the bed 21 on the second longitudinal side portion 17. The first and second guide rails "R1" and "R2" may be attached to the frame 22 and/or bed 21. The first and second guide rails "R1" and "R2" define a longitudinally extending channel or passageway 58 therebetween. The first and second guide rails "R1" and "R2" help maintain the cargo 90 on the bed 21 as the cargo is loaded thereupon and/or loaded by the apparatus 10 onto the trailer 125.

Returning to FIG. 1, the frame 22 has a front end portion 12 opposite a rear end portion 14. The passageway 58 is open adjacent the rear end portion 14 of the frame 22. The frame 22 has a rear section 24 at an opposite end portion of the frame from a front section 26. In the embodiment depicted, the rear section 24 is longer than the front section 26. The length of the rear section 24 may be determined at least in part by the length of the trailer 125.

By way of a non-limiting example, the frame 22 may be incorporated into a height adjustable flat bed trailer 20 configured to be pulled behind a semi tractor (not shown). In such embodiments, the apparatus 10 is configured to be mobile and moveable from one location to another. However, this is not a requirement. In alternate embodiments, the frame 22 may be implemented as a stationary support frame (not shown). For example, the apparatus 10 may be installed on or near a shipping dock in a permanent installation. Optionally, in embodiments in which the frame 22 is a component of the trailer 20, the front end portion 12 of the frame 22 may be selectively couplable to the tractor (not shown). Further, the frame 22 may be optionally coupled by the rear end portion 14 to the rear portion 126 of the trailer 125.

Figure 3:
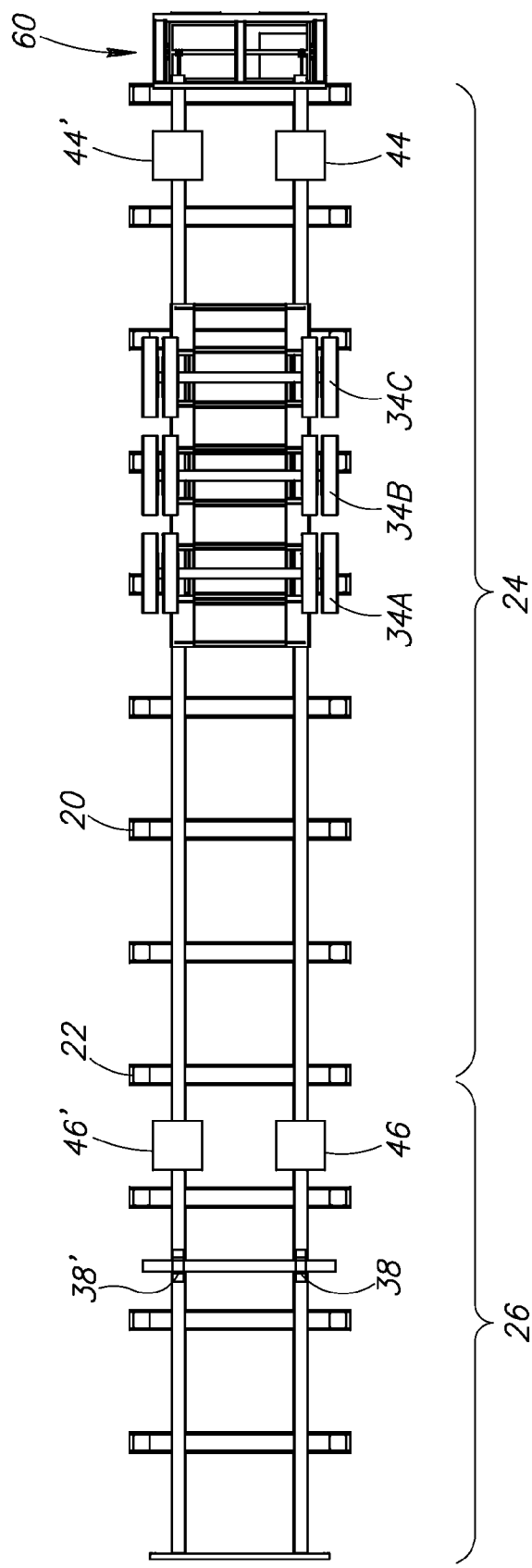
FIG. 3 is a top plan view of a frame of a trailer of the cargo loader apparatus of FIG. 1.

Referring to FIGS. 1 and 3, in embodiments in which the frame 22 is a component of the trailer 20, one or more conventional wheel and axle assemblies 37A-37C are rotatably mounted on the underside of the rear section 24 of the frame 22. Two manually adjustable support legs 38 and 38' and a tractor king pin 42 are mounted on the underside of the front section 26 of the frame 22. The tractor king pin 42 is designed to be attached to the fifth wheel coupling on the semi tractor or a tug (not shown).

Optionally, a first pair of adjustable hydraulic legs 44 and 44' may be attached to the underside of the rear section 24 and a second pair of adjustable hydraulic legs 46 and 46' may be attached to the underside of the front section 26. When the trailer 20 is pulled behind the tractor, the tractor king pin 42 is attached to the fifth wheel coupling on the tractor and the wheels of the wheel and axle assemblies 37A-37C are disposed on the ground. To decouple the trailer 20 from the tractor, the hydraulic legs 44, 44', 46, and 46' are lowered to the ground. Then, the tractor king pin 42 is detached from the fifth wheel coupling and the tractor is driven forward and away from the trailer 20. Thus, the trailer 20 is supported on the ground by the hydraulic legs 44, 44', 46, and 46' and the wheel and axle assemblies 37A-37C.

As illustrated in FIG. 1, the length of the hydraulic legs 44, 44', 46, and 46' may be increased to raise the height of the bed 21 of the trailer 20 relative to the ground. In the configuration depicted in FIG. 1, the hydraulic legs 44, 44', 46, and 46' support the entire weight of the apparatus 10 and its cargo 90. The length of the first and second pairs of adjustable hydraulic legs 44, 44', 46, and 46' may be decreased or increased to lower or raise the bed 21 of the trailer 20 to a desired height.

Returning to FIG. 2, first and second chains 150 and 160 are longitudinally aligned with the bed 21 and extend along its length. Each of the chains 150 and 160 is anchored at its opposite ends to opposite ends of the bed 21. Thus, one end of each of the chains 150 and 160 is affixed to the bed 21 toward the front end portion 12 of the frame 22 and the other end of each of the chains 150 and 160 is affixed to the bed 21 toward the rear end portion 14 of the frame 22. In the embodiment depicted, each of the chain 150 and 160 resides in a channel 152 formed in the bed 21 that helps maintain the lateral position of the chain relative to the bed.

Movable Carriage

Figure 5A:
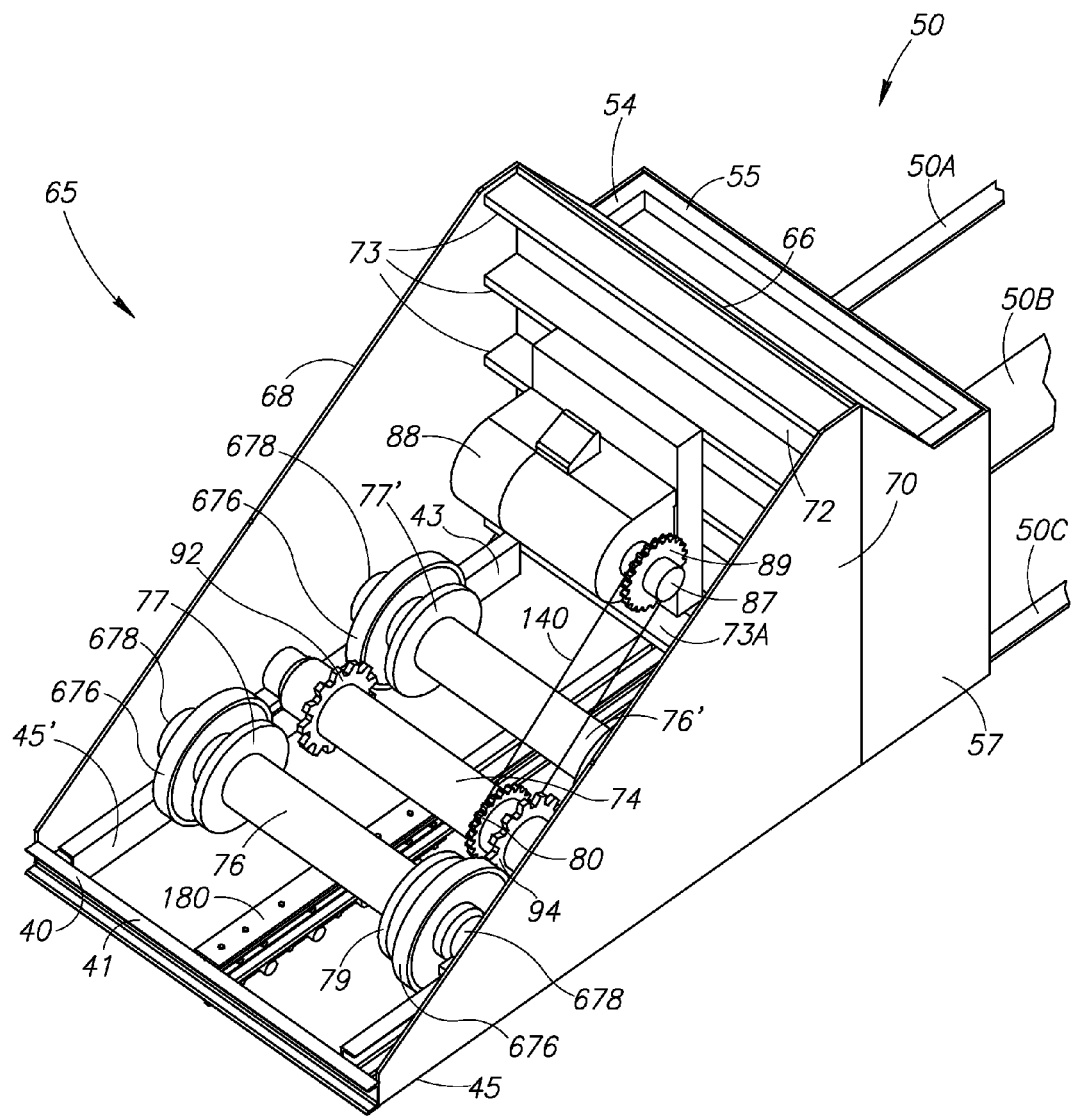
FIG. 5A is a perspective view of a carriage of the cargo loader apparatus of FIG. 1 taken from behind a ram surface to which a plurality of forks are attached.

Turning to FIGS. 2 and 5A, the apparatus 10 includes a movable sled or carriage 65 mounted on the bed 21 and coupled to the chains 150 and 160. The carriage 65 is designed to move fore and aft longitudinally over the bed 21 within the passageway 58. The path of travel of the carriage 65 is determined by the chains 150 and 160. Thus, the length of the path of travel may be increased or decreased by changing the lengths of the chains 150 and 160 and/or the locations along the bed 21 at which the ends of the chains 150 and 160 are affixed.

The carriage 65 includes a base portion 40 disposed on the bed 21. The base portion 40 has a front portion 41, a rear portion 43, and two opposing side portions 45 and 45' substantially aligned longitudinally with the sides 16 and 17, respectively, of the bed 21. The carriage 65 also includes a pair of spaced apart sidewalls 68 and 70, each mounted to one of the portions 45 and 45' of the base portion, and a rearwardly facing planar ram surface 66 extending between the sidewalls 68 and 70. The planar ram surface 66 is substantially perpendicular to the base portion 40 and attached to the rear portion 43 of the base portion 40. The carriage 65 includes a rear wall 72 opposite the front ram surface 66. One or more supports 73 may be mounted to the rear wall 72 and extend between the sidewalls 68 and 70. The rear wall 72 may be coupled to the rear portion 43 of the base portion 40 by a lower support 73A.

One or more movable support platforms or forks 50 are coupled to the ram surface 66 for movement therewith and extend outwardly therefrom longitudinally along the bed 21. As may best be viewed in FIG. 5B, in the embodiment illustrated, three forks 50A-50C are coupled by their proximal ends 51A-51C to the ram surface 66. Returning to FIG. 2, the forks 50A-50C have free distal ends 52A-52C, respectively, opposite the coupled proximal ends 51A-51C (see FIG. 5B), respectively. The forks 50A-50C are configured to receive and support the cargo 90 (see FIG. 1) and slide along the bed 21 to move (or carry) the cargo along the bed 21 as the carriage 65 moves fore and aft longitudinally over the bed 21 within the passageway 58. The forks 50A-50C illustrated are generally elongated and planar. The forks 50A-50C may extend along all or a portion of the portion of the bed 21 adjacent and supported by the rear section 24 of the frame 22. In the embodiment illustrated, the fork 50B is wider than the forks 50A and 50C. Optionally, a lubricant (e.g., grease) may be disposed between the forks 50A-50C and the bed 21 to facilitate the sliding of the forks 50A-50C along the bed 21.

The forks 50A-50C are positioned adjacent the rear section 24 of the frame 22 when the carriage 65 is positioned adjacent the front section 26. In this position, the cargo 90 (see FIG. 1) may be loaded onto the forks 50A-50C. When the carriage 65 moves toward the rear end portion 14 of the frame 22, the carriage 65 pushes the forks 50A-50C along the bed 21. When pushed far enough, the distal ends 52A-52C leave the bed 21 to extend rearwardly past the rear end portion 14 of the frame 22. The forks 50A-50C extend outwardly in a cantilever fashion from the bed 21 when the carriage 65 is positioned adjacent the back section 24 of the frame 22.

Figure 5B:
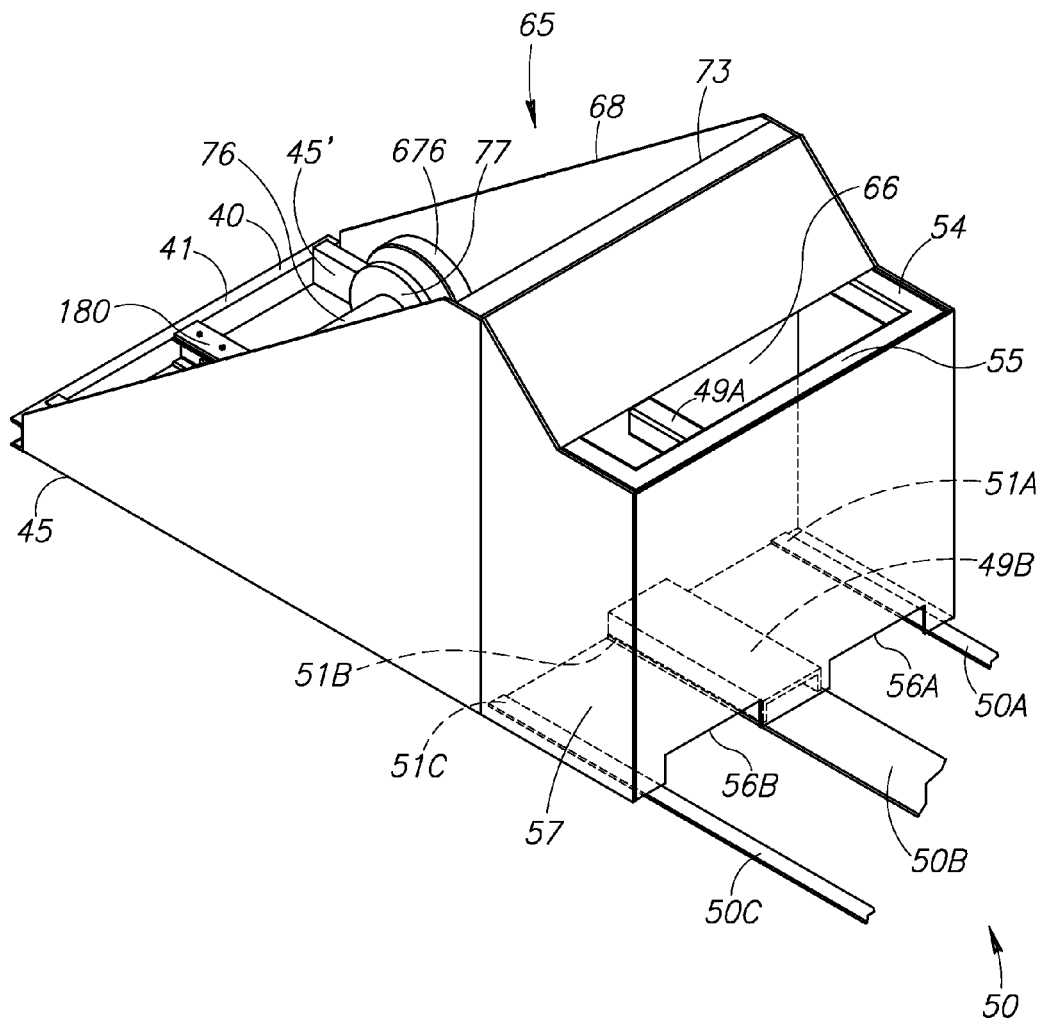
FIG. 5B is a perspective view of a carriage of the cargo loader apparatus of FIG. 1 taken from in front of the ram surface to which the plurality of forks are attached.

Turning to FIG. 5B, in the embodiment illustrated, an extension assembly 54 is attached to the carriage 65 adjacent the ram surface 66. The extension assembly 54 extends outwardly from the ram surface 66 above the forks 50A-50C. In particular embodiments, the extension assembly 54 may rest upon the forks 50A-50C and may be supported thereby. The extension assembly 54 has a forward facing portion 55 spaced apart from the ram surface 66 with a hollow lower portion 57 defined between a lower portion of the forward facing portion 55 and a lower portion of the ram surface 66. One or more longitudinally extending support members 49A and 49B may extend between the ram surface 66 and the forward facing portion 55. In the embodiment illustrated, the support member 49B rests upon the proximal end 51B of the fork 50B. The forward facing portion 55 includes lower cutout portions 56A and 56B positioned adjacent the bed 21 (see FIG. 2). Each of the lower cutout portions 56A and 56B is in communication with the hollow lower portion 57 and provides ingress into and egress from the hollow lower portion 57.

Returning to FIG. 5A, a drive axle 74 is mounted transversely on the base portion 40 of the carriage 65. The drive axle 74 has a front guide axle 76 in front of it and a rear guide axle 76' behind it, both of which are mounted transversely on the base portion 40 of the carriage 65. A main sprocket 80 flanked by two secondary gears 92 and 94 are mounted on the drive axle 74. Referring to FIG. 2, the secondary gears 92 and 94 are configured to engage the two chains 150 and 160, respectively.

Returning to FIG. 5A, a motor 88 is mounted on the rear wall 72. The motor 88 may include any suitable motor known in the art including an electric motor, hydraulic motor, and the like. The motor 88 is configured to rotate a drive shaft 87 having a sprocket 89 attached thereto. The main sprocket 80 mounted on the drive axle 74 is engaged by a chain 140 entrained on the sprocket 89 attached to a drive shaft 87 of the motor 88.

Returning to FIGS. 2 and 5A, the front guide axle 76 includes two guide sprockets 77 and 79 aligned over the two chains 150 and 160, respectively. The rear guide axle 76' includes two guide sprockets 77' and 79' aligned over the two chains 150 and 160, respectively. During assembly of the apparatus 10, the carriage 65 is coupled to the chains 150 and 160. Specifically, the chain 150 is looped over the sprockets 77 and 77' and the chain 160 is looped over the sprockets 79 and 79' to hold the carriage 65 on the bed 21. Thus, after assembly, the chain 150 loops over the sprocket 77, under the secondary gear 92, and over the sprocket 77', and the chain 160 loops over the sprocket 79, under the secondary gear 94, and over the sprocket 79'.

Each of the front guide axle 76 and the rear guide axle 76' have a wheel 676 (described below) mounted toward each end thereof. Specifically, a first wheel 676 is mounted to the front guide axle 76 between the guide sprockets 77 and the sidewall 68 and a second wheel 676 is mounted to the front guide axle 76 between the guide sprockets 79 and the sidewall 70. A first wheel 676 is mounted to the rear guide axle 76' between the guide sprockets 77' and the sidewall 68 and a second wheel 676 is mounted to the rear guide axle 76' between the guide sprockets 79' and the sidewall 70.

By activating the motor 88 in a first direction, when the secondary gears 92 and 94 are engaged with the chains 150 and 160, respectively, the carriage 65 is moved in a first direction (e.g., forward toward the front end portion 12 of the frame 22) over the bed 21. By activating the motor 88 in a second direction opposite the first, when the secondary gears 92 and 94 are engaged with the chains 150 and 160, respectively, the carriage 65 is moved in a second direction opposite the first (e.g., rearward toward the rear end portion 14 of the frame 22) over the bed 21. In the embodiment depicted, the carriage 65 rolls along the bed 21 on the wheels 676.

Figure 6:
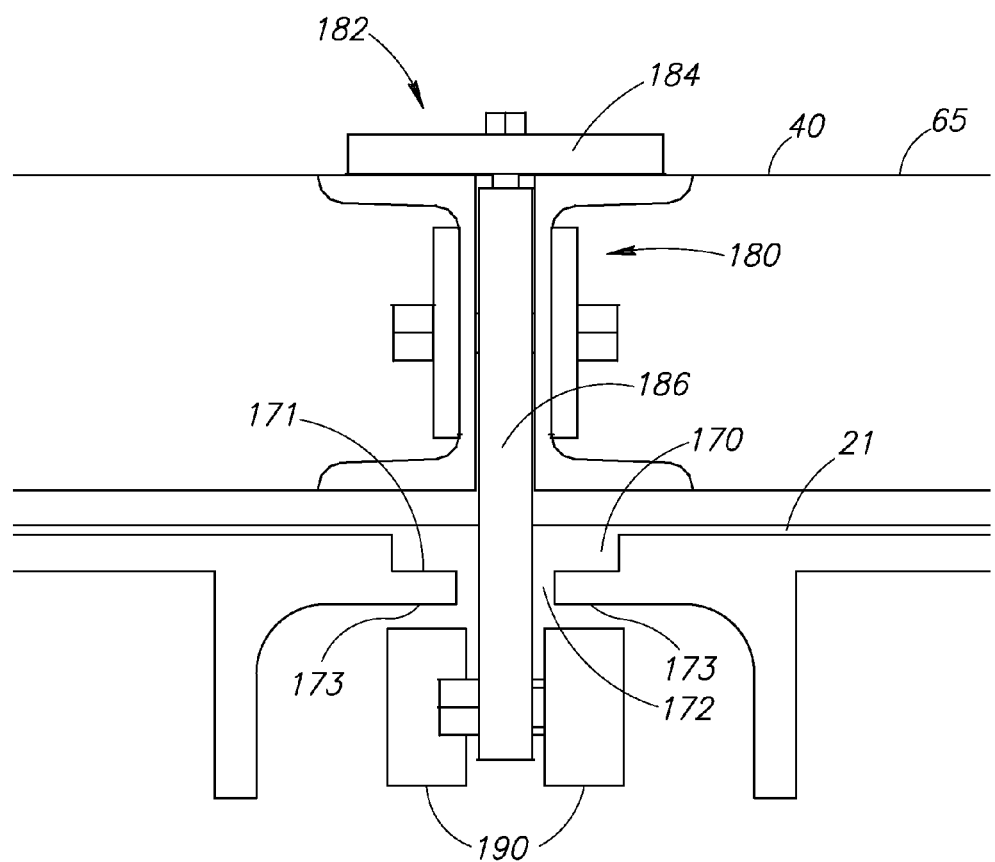
FIG. 6 is an enlarged lateral cross-sectional view of a traveler assembly coupled to the carriage of FIGS. 5A and 5B and engaged with a center channel formed in the bed of the cargo loader apparatus.

As mentioned above, the bed 21 includes the longitudinally extending center channel 170 located between the pair of channels 152 in which the chains 150 and 160 reside. Referring to FIG. 6, the center channel 170 has a bottom portion 171 in which a longitudinally extending through-slot 172 extends. The carriage 65 includes a traveler assembly 180 attached to the base portion 40 of the carriage. The traveler assembly 180 is described in more detail below with respect to an alternate embodiment. The traveler assembly 180 includes a T-shaped assembly 182 with a top horizontal plate 184 coupled to an upright center plate 186. Attached to the lower end of the center plate 186 are several sets of support wheels 190 that extend from opposite faces of the center plate 186. During use, the center plate 186 is disposed inside the slot 172 formed in the longitudinal channel 170 of the bed 21. When the carriage 65 is moving, the wheels 190 press against a longitudinally extending portion 173 of the underside of the bed 21 so that the carriage 65 moves freely over the channel 170 and its upward movement from the bed 21 is restricted by the wheels. The traveler assembly 180 may prevent the carriage 65 from being pulled sideways by its drive mechanisms engagement with the chains 150 and 160.

As illustrated in FIGS. 1 and 2, the apparatus 10 includes a cargo retention assembly 60 coupled to the rear end portion 14 of the frame 22. After the forks 50A-50C and the cargo 90 carried by the forks have been moved sufficiently rearward to be positioned inside the trailer 125, the cargo retention assembly 60 engages a portion of the cargo 90 adjacent the carriage 65 (and the opening 128) and holds the cargo inside the trailer 125 as the forks 50A-50C are withdrawn from the trailer 125. As the forks 50A-50C are withdrawn, portions of the cargo 90 sequentially slide off the free distal ends 52A-52C of the forks 50A-50C and onto the floor 129 of the trailer 125.

Figure 22:
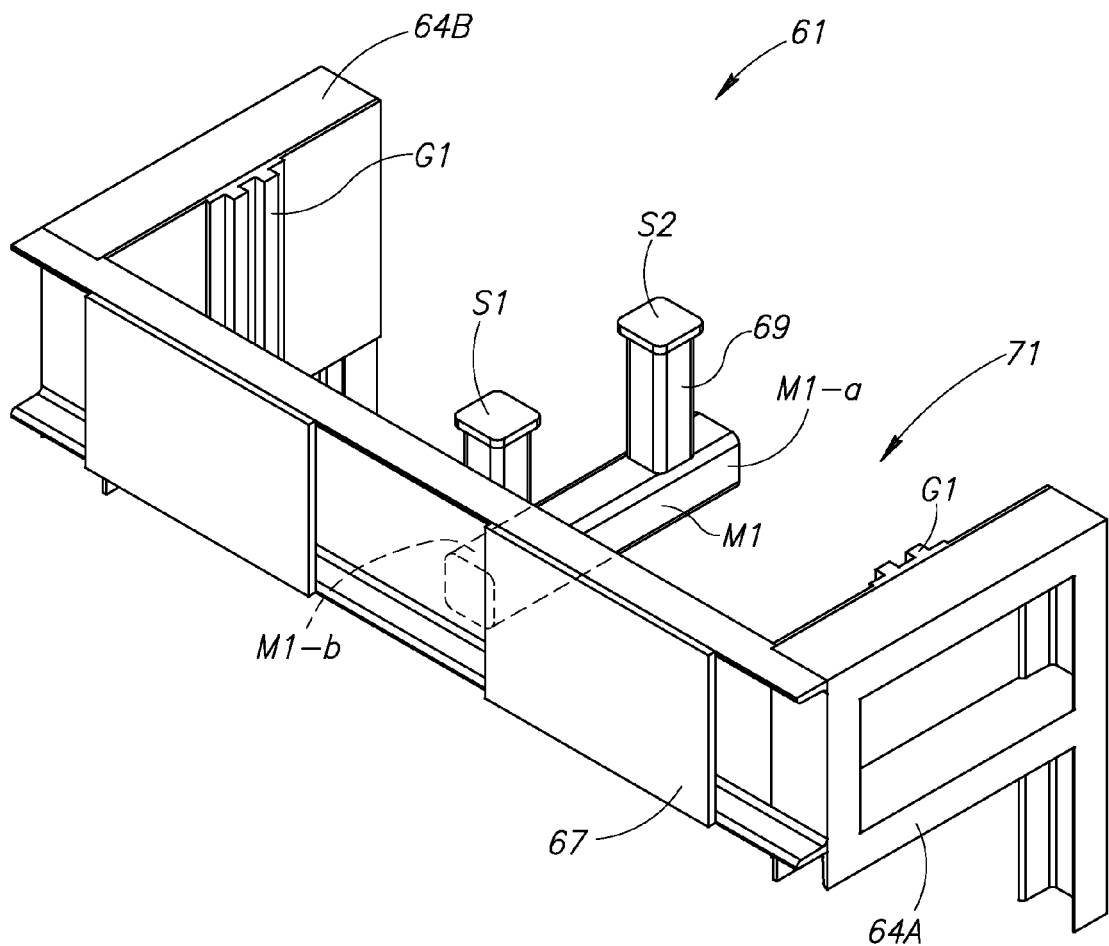
FIG. 22 is a perspective view of a frame of the cargo retention assembly for use with the cargo loader apparatuses of FIGS. 1 and 7A.

Referring to FIG. 2, the cargo retention assembly 60 includes a frame 61, a positioning assembly 59 movable relative to the frame 61, and two retention mechanisms 62A and 62B coupled to the positioning assembly 59 and configured to be positioned thereby. The retention mechanisms 62A and 62B are referred to collectively by reference numeral 62. If desired, fewer or more retention members may be used. As may best be seen in FIG. 1, the frame 61 is non-movably coupled to the rear end portion 14 of the frame 22. Turning to FIG. 22, the frame 61 illustrated includes a pair of spaced apart side support members 64A and 64B configured to be non-movably coupled to the rear end portion 14 (see FIG. 1) of the frame 22. The side support members 64A and 64B may be substantially identical to one another. A transverse frame assembly 67 spaced apart from the rear end portion 14 (see FIG. 1) of the frame 22 extends between the side support members 64A and 64B. Thus, depending upon the implementation details, side support members 64A and 64B, the transverse frame assembly 67, and the rear end portion 14 (see FIG. 1) of the frame 22 may define an interior space 71.

Optionally, the frame 61 may also include a fork support assembly 69 positioned inside the interior space 71. The fork support assembly 69 may include a longitudinally extending member "M1" coupled by a first portion "M1-a" to the rear end portion 14 (see FIG. 1) of the frame 22 and a second end portion "M1-b" to the transverse frame assembly 67. One or more upright supports "S1" and "S2" configured to support the fork 50B (see FIG. 2) may be coupled to and supported by the longitudinally extending member "M1." Optionally, an upright guide "G1" may be coupled to each of the side support members 64A and 64B inside the interior space 71.

Figure 23A:
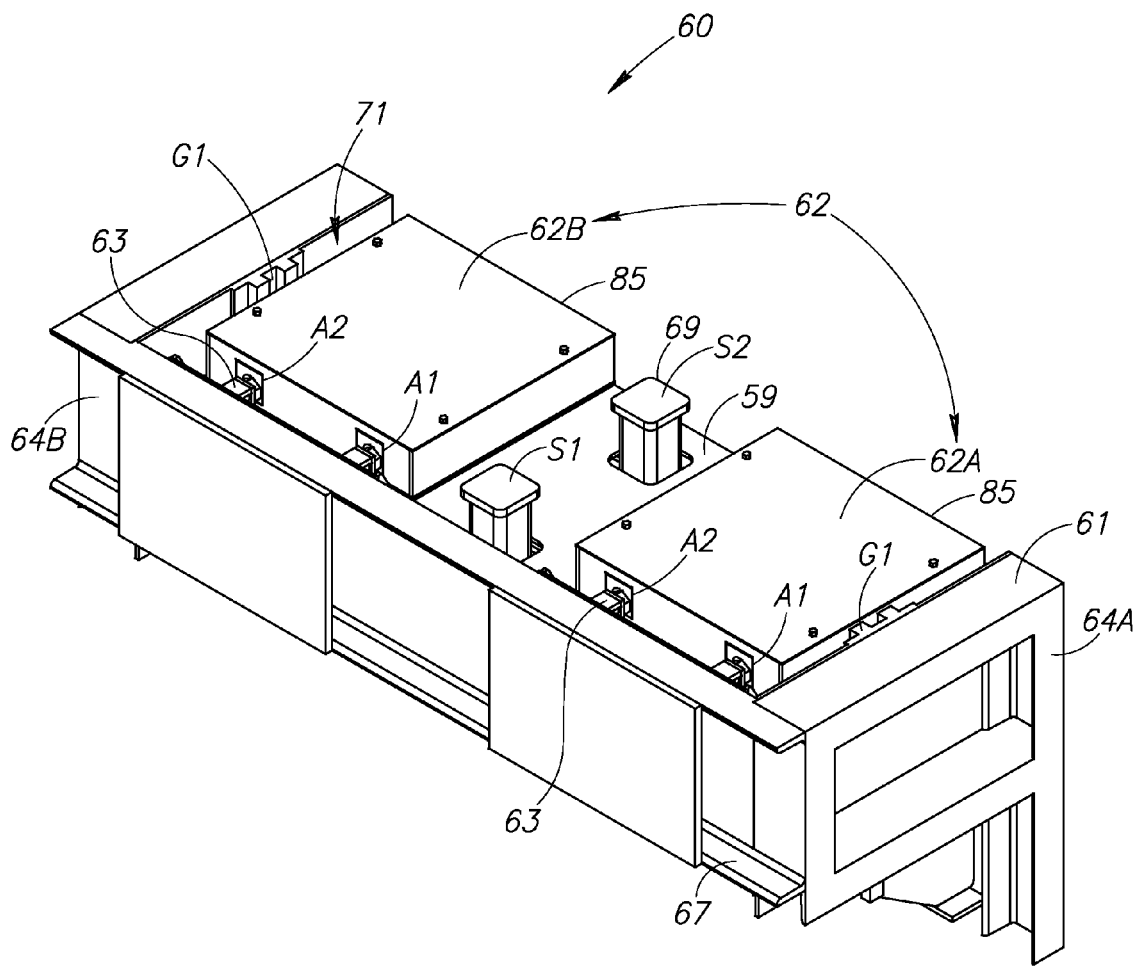
FIG. 23A is a perspective view of the cargo retention assembly for use with the cargo loader apparatuses of FIGS. 1 and 7A positioned in a lowered/retracted position.
Figure 23B:
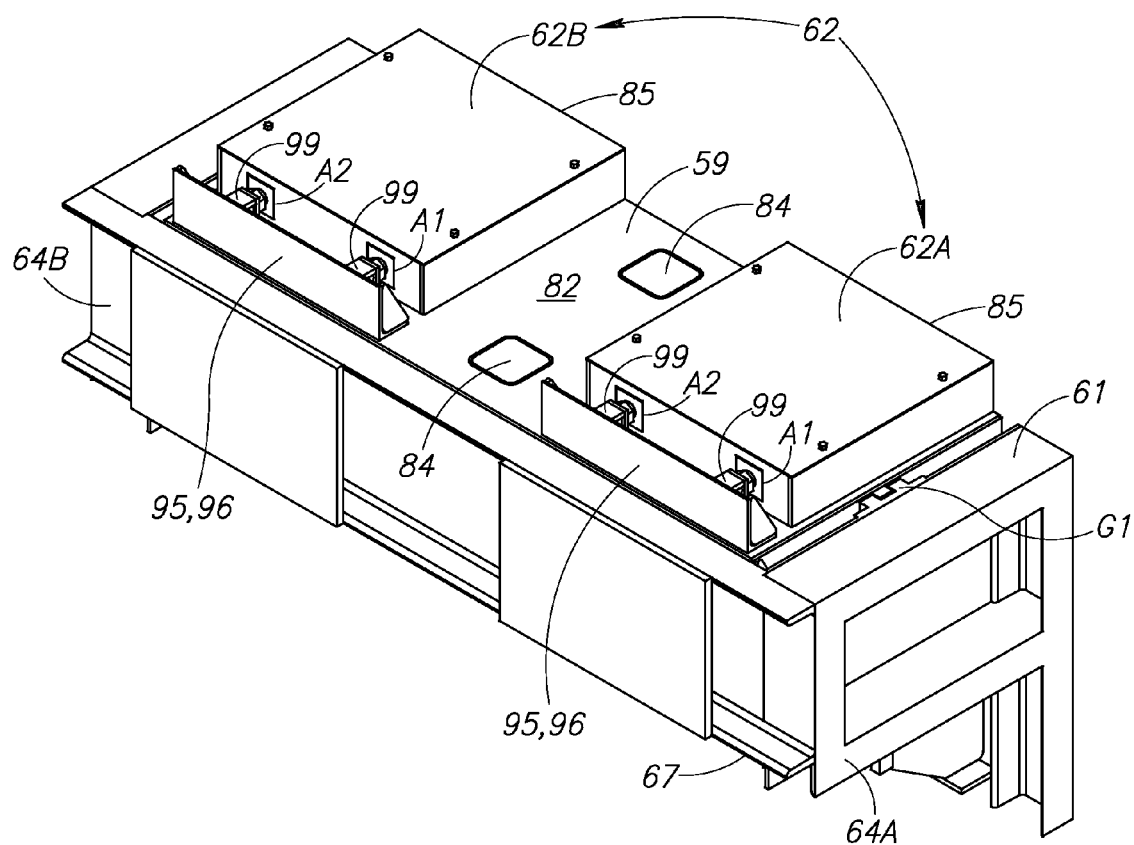
FIG. 23B is a perspective view of the cargo retention assembly for use with the cargo loader apparatuses of FIGS. 1 and 7A positioned in a raised/retracted position.
Figure 23C:
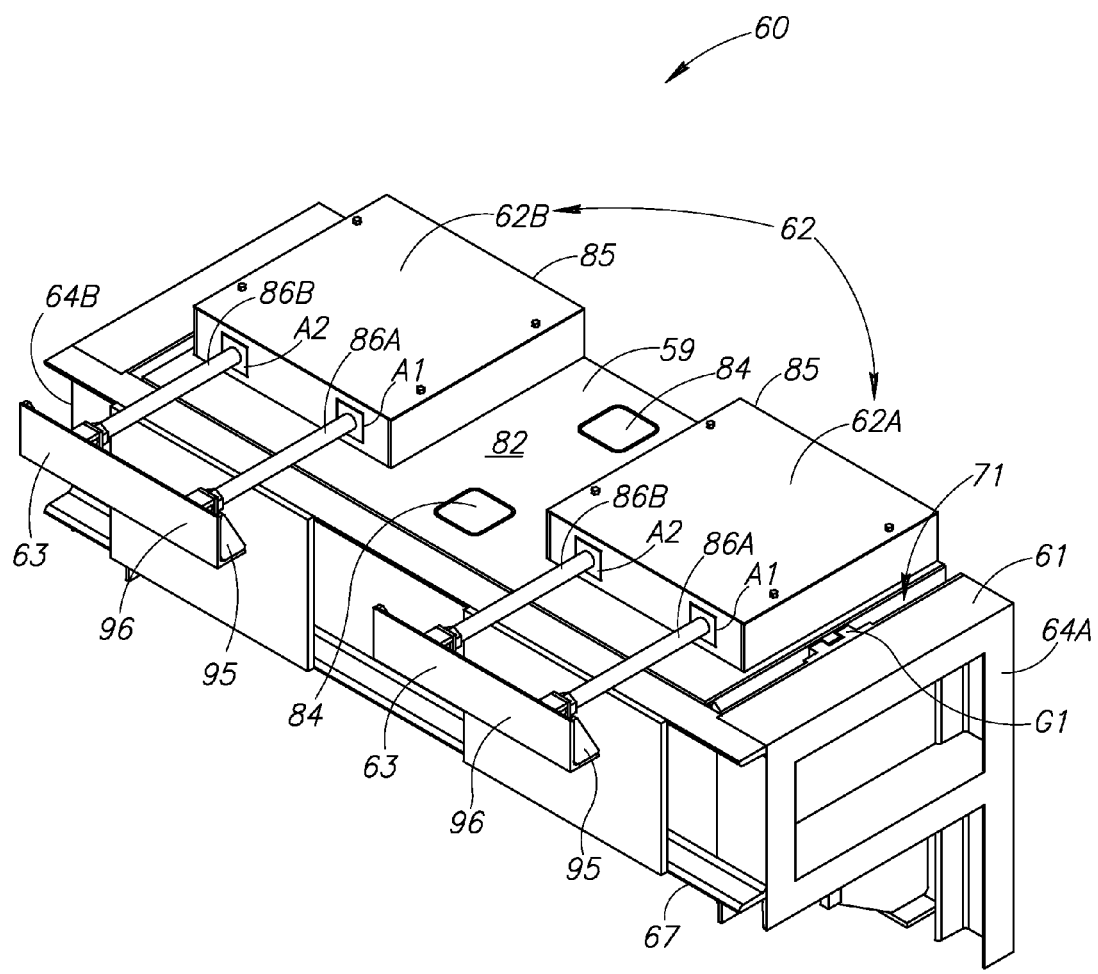
FIG. 23C is a perspective view of the cargo retention assembly for use with the cargo loader apparatuses of FIGS. 1 and 7A positioned in a raised/extended position.

Referring to FIGS. 23A-23C, the positioning assembly 59 is movably coupled to the frame 61 inside the interior space 71 and configured to move between a lower position (illustrated in FIG. 23A) and a raised position (illustrated in FIGS. 23B and 23C) inside the interior space 71. In the embodiment illustrated, the positioning assembly 59 includes mounting brackets "B1" and "B2" (see FIGS. 24A and 24B) that couple the positioning assembly 59 to the frame 61.

Figure 24A:
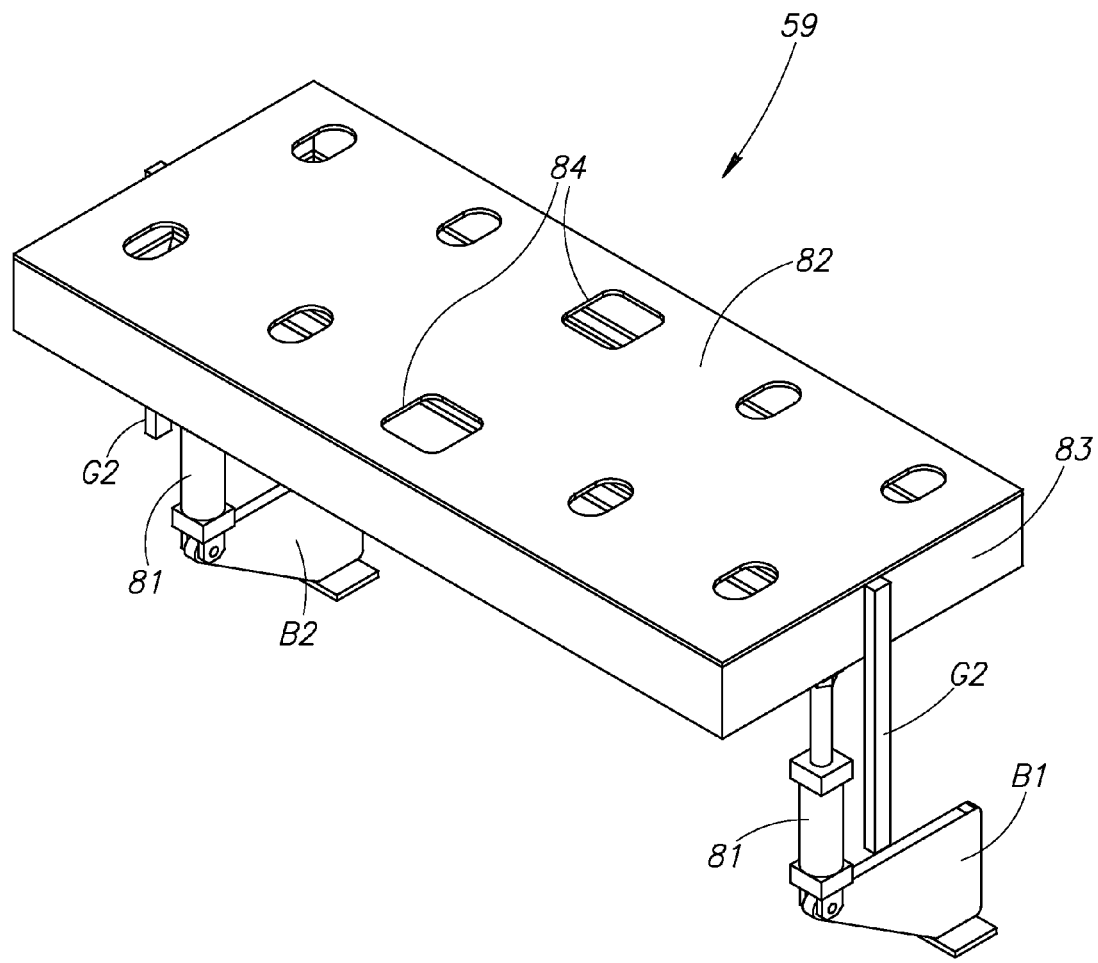
FIG. 24A is a perspective view of a positioning assembly of the cargo retention assembly for use with the cargo loader apparatuses of FIGS. 1 and 7A.
Figure 24B:
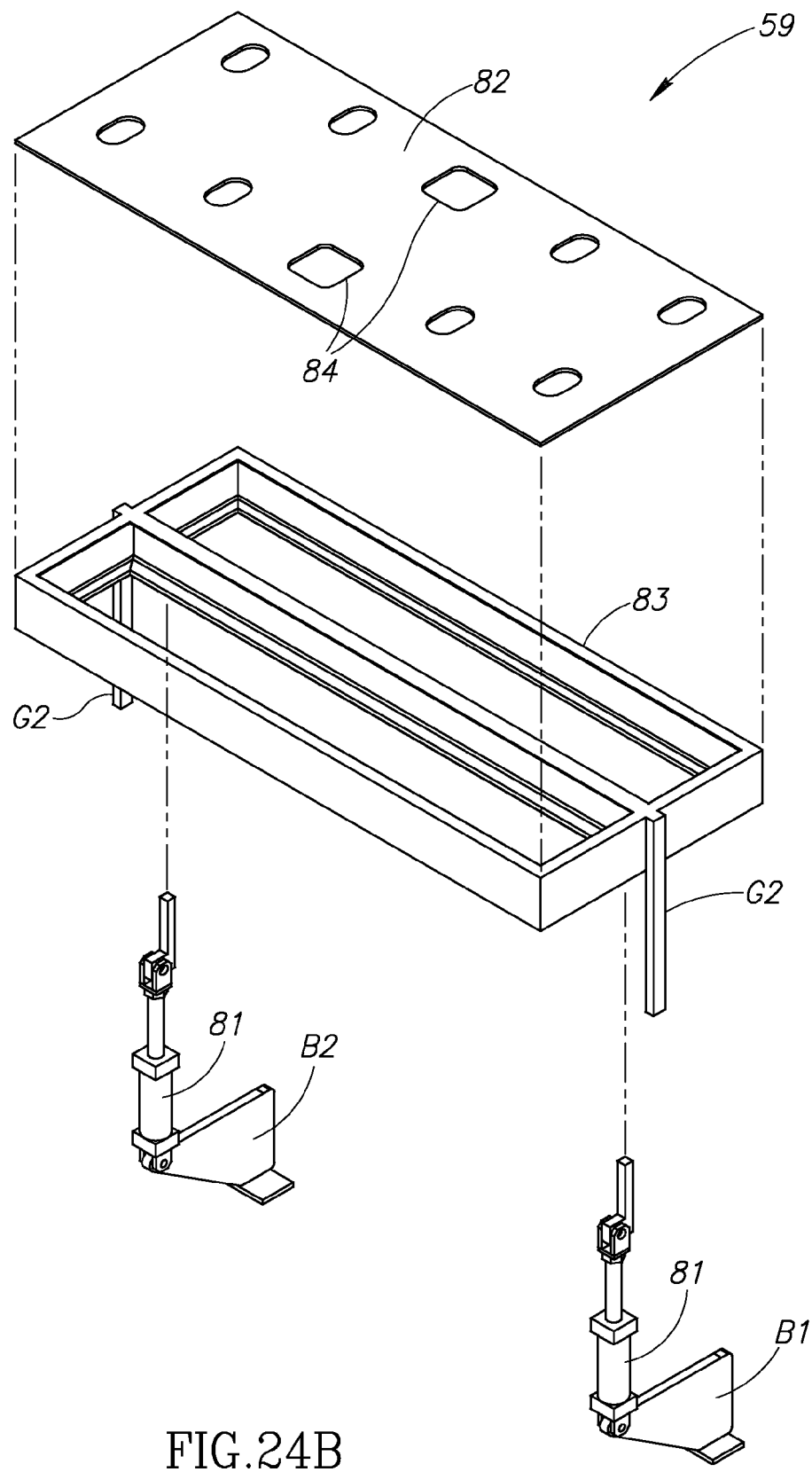
FIG. 24B is a perspective partially exploded view of the positioning assembly of FIG. 24A.

Turning to FIGS. 24A and 24B, a conventional hydraulic cylinder 81 is coupled to each of the mounting brackets "B1" and "B2" and used to raise and lower a support plate 82 mounted on a support frame 83. Guide members "G2" may be mounted on the support frame 83 and positioned to engage the upright guides "G1" (see FIG. 22) coupled to each of the side support members 64A and 64B (see FIG. 22) inside the interior space 71 (see FIG. 22). Engagement between the guide members "G2" and the upright guides "G1" (illustrated in FIG. 22 and coupled to each of the side support members 64A and 64B) may help guide upward and downward movement of the positioning assembly 59 as it transitions between raised and lowered positions. In embodiments including the fork support assembly 69 (see FIG. 22), apertures 84 may be formed in the support plate 82 to permit the upright supports "S1" and "S2" (illustrated in FIG. 22 and configured to support the fork 50B) to extend through the support plate 82 and thereby not interfere with the movement of the support plate 82.

Returning to FIG. 2, in the embodiment illustrated, the cargo retention assembly 60 includes two retention mechanisms 62A and 62B. The retention mechanisms 62A and 62B are movable by the positioning assembly 59 relative to both the frame 61 and the frame 22 between a lowered position (illustrated in FIGS. 1, 2, and 23A) and a raised position (illustrated in FIGS. 23B and 23C). Thus, the retention mechanisms 62A and 62B are also positionable by the positioning assembly 59 relative to the bed 21 between the lowered and raised positions.

In the embodiment illustrated, the retention mechanisms 62A and 62B are coupled to and ride upon the support platform 82 of the positioning assembly 59. Turning to FIG. 23C, each of the retention mechanisms 62A and 62B includes a housing 85 non-movably coupled to the support platform 82 of the positioning assembly 59 that houses at least a portion of an extendable and retractable cargo engagement assembly 63. The cargo engagement assembly 63 includes two conventional hydraulic cylinders 86A and 86B connected to a cargo engagement member 95. The conventional hydraulic cylinders 86A and 86B are referred to collectively by reference numeral 86 (see FIG. 25). If desired, fewer or more hydraulic cylinders may be used and connected to the engagement member 95. The engagement member 95 has an engagement surface 96 configured to engage the cargo 90 (see FIG. 1) when the cargo is positioned inside the trailer 125 (see FIG. 1). The hydraulic cylinders 86A and 86B move the engagement member 95 between a retracted position (illustrated in FIGS. 1, 2, 23A, and 23B) and an extended position (illustrated in FIG. 23C).

Figure 25:
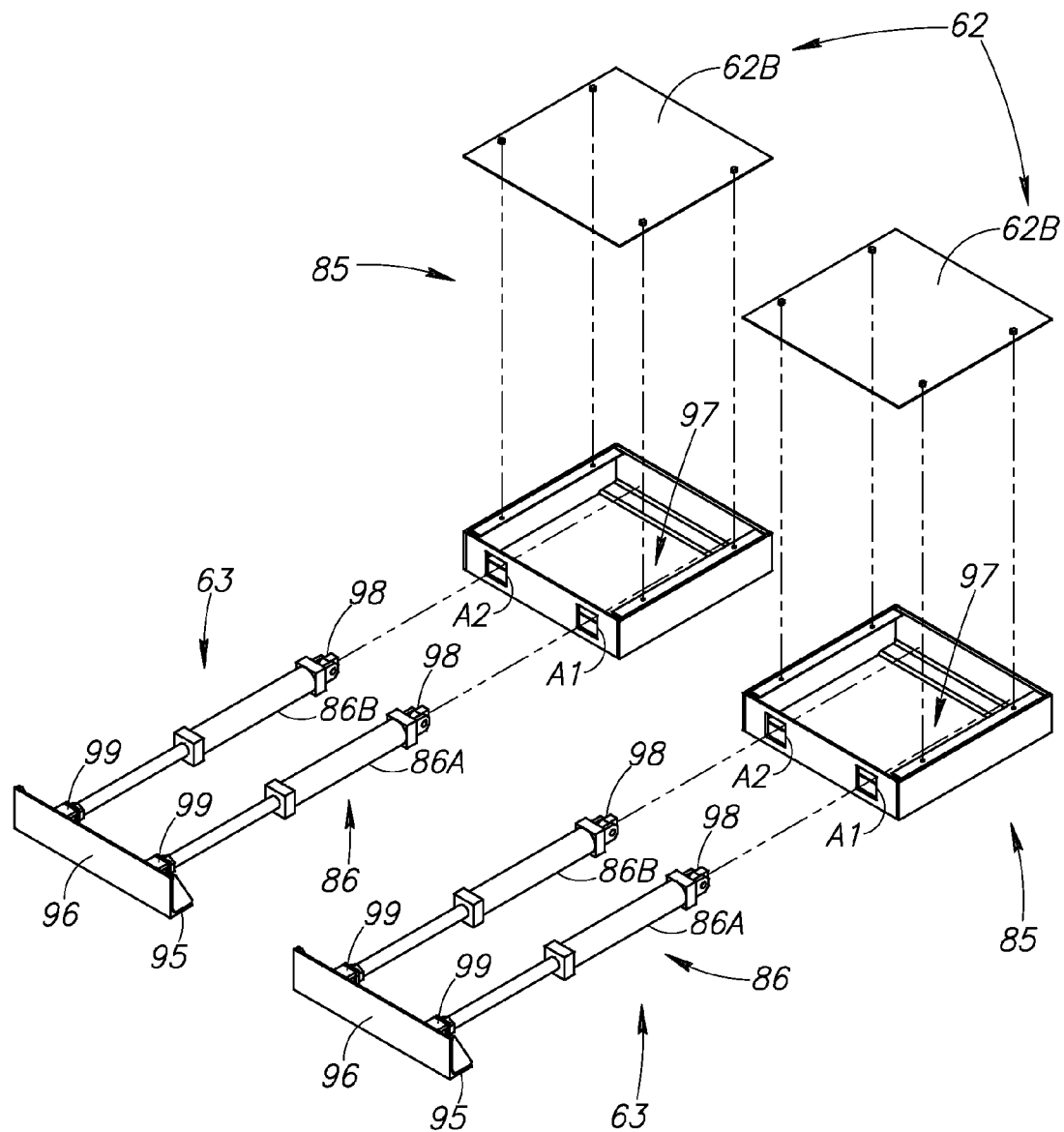
FIG. 25 is a perspective partially exploded view of the retention mechanisms of a cargo retention assembly of FIGS. 23A-23C.

Turning to FIG. 25, in the embodiment illustrated, the housing 85 has a hollow interior portion 97. The bodies of the hydraulic cylinders 86A and 86B are connected at their proximal ends 98 inside the hollow interior portion 97 of the housing 85. The housing 85 includes apertures "A1" and "A2" through which the piston rods of the hydraulic cylinders 86A and 86B extend from inside the hollow interior portion 97. A distal end 99 of each of the piston rods of the hydraulic cylinders 86A and 86B is positioned outside the hollow interior portion 97 and is connected to the engagement member 95.

When the retention mechanisms 62A and 62B are in the lowered position (illustrated in FIGS. 1, 2, and 23A), the cargo engagement assemblies 63 of the retention mechanisms 62A and 62B are positioned in the retracted position and located behind the transverse frame assembly 67. However, as illustrated in FIGS. 23B and 23C, when the retention mechanisms 62A and 62B are in the raised position, the cargo engagement assemblies 63 may be in either the retracted or the extended position.

Referring to FIG. 2, the retention mechanisms 62A and 62B are configured to be stored below the upper surface of the bed 21 when not in use and to be raised up between the forks 50A-50C to hold the cargo 90 (see FIG. 1) inside the trailer 125 (see FIG. 1) as the forks are withdrawn. Specifically, the retention mechanism 62A raises up between the forks 50A and 50B and the retention mechanism 62B raises up between the forks 50B and 50C. In the embodiment illustrated, the retention mechanisms 62A and 62B may be at least partially received inside the hollow lower portion 57 and/or the lower cutout portions 56A and 56B, respectively, of the extension assembly 54. Then, referring to FIG. 23C, the hydraulic cylinders 86A and 86B of the cargo engagement assemblies 63 push the engagement member 95 into engagement with the cargo 90 (see FIG. 1) inside the trailer 125 to hold the cargo inside the trailer 125 as the forks 50A-50C (see FIG. 2) are withdrawn from inside the trailer 125 by the movement of the carriage 65 toward the front end portion 12 of the frame 22. The cargo 90 is held stationary as the forks move so that the cargo slides off the distal ends 52A-52C of the forks as they are withdrawn. If the retention mechanisms 62A and 62B are within the hollow lower portion 57, the engagement member 95 may exit therefrom via the lower cutout portions 56A and 56B, respectively.

Referring to FIGS. 23A-23C, the retention mechanisms 62 are positionable in three positions: a lowered/retracted position (illustrated in FIG. 23A), a raised/retracted position (illustrated in FIG. 23B), and a raised/extended position (illustrated in FIG. 23C). In the lowered/retracted position (illustrated in FIG. 23A), the positioning assembly 59 has lowered the retention mechanisms 62 to the lowered position and the hydraulic cylinders 86A and 86B have moved the engagement member 95 to the retracted position. In the raised/retracted position (illustrated in FIG. 23B), the positioning assembly 59 has raised the retention mechanisms 62 to the raised position and the hydraulic cylinders 86A and 86B maintain the engagement member 95 in the retracted position. In the raised/extended position (illustrated in FIG. 23C), the positioning assembly 59 has raised the retention mechanisms 62 to the raised position and the hydraulic cylinders 86A and 86B have moved the engagement member 95 to the extended position.

When both the cargo 90 is being loaded onto the forks 50A-50C and the forks are being moved into the trailer 125, the retention mechanisms 62 are in the lowered/retracted position (illustrated in FIG. 23A). After the cargo 90 has been moved into the trailer 125 by the forks 50A-50C, the retention mechanisms 62 are raised to the raised/retracted position (illustrated in FIG. 23B). Before the apparatus 10 withdraws the forks 50A-50C from the trailer 125, the retention mechanisms 62 are placed in the raised/extended position (illustrated in FIG. 23C). After the forks 50A-50C are withdrawn, the retention mechanisms 62 are returned to the raised/retracted position (illustrated in FIG. 23B). Lastly, the retention mechanisms 62 may be returned to the lowered/retracted position (illustrated in FIG. 23A) for storage inside the interior space 71 of the frame 61.

The length of the forks 50A-50C may be determined at least in part on the length of the cargo receiving portion of the trailer 125. For example, the forks 50A-50C may be configured to extend through the opening 128 in the open rear end portion 126 of the trailer to a front end portion opposite the open rear end portion. Further, as is apparent to those of ordinary skill in the art, the forks 50A-50C may be longer than the floor 129 of the trailer 125 to reach from the carriage 65 to the front end portion of the trailer 125. Thus, the forks 50A-50C may be at least as long as the floor 129 of the cargo receiving portion of the trailer 125.

Turning to FIGS. 1 and 2, the apparatus 10 includes a control center 48 located on the front section 26 of the frame 22. The control center 48 may include a hydraulic pump 200 and an electric generator 202 mounted at the front section 26 of the frame 22. Alternatively, an external hydraulic pump 200 and/or an external electric generator 202 may be coupled to the control center 48. By way of a non-limiting example, the hydraulic pump 200 may include a compressed air source (such as an air compressor or compressed air tank), Porta Power unit, and the like. The hydraulic pump 200 and the electric generator 202 are connected to and power the trailer's four hydraulic legs 44, 44', 46, and 46', the height adjustable hydraulic vertical supports 53 and 56 for the sidewalls 50 and 55, and the motor 88 on the carriage 65.

Figure 4A:
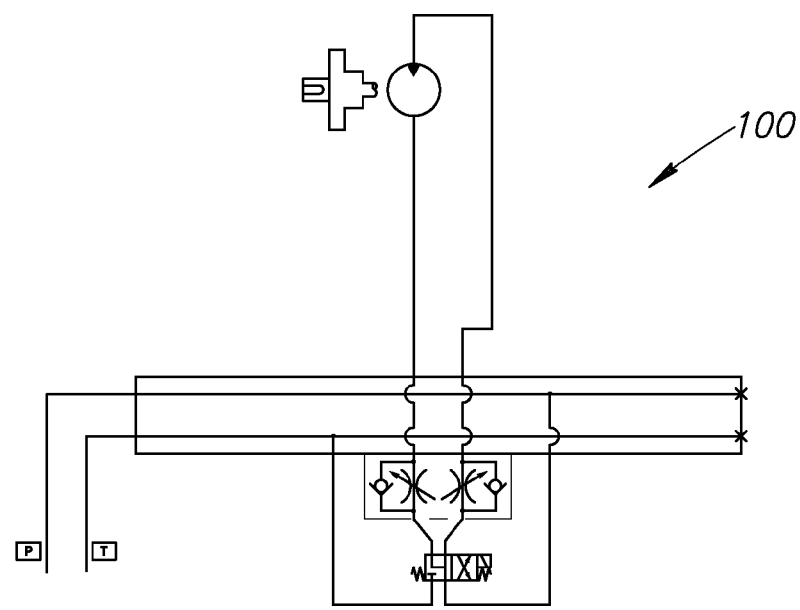
FIG. 4A is a diagram of the hydraulic control system.
Figure 4B:
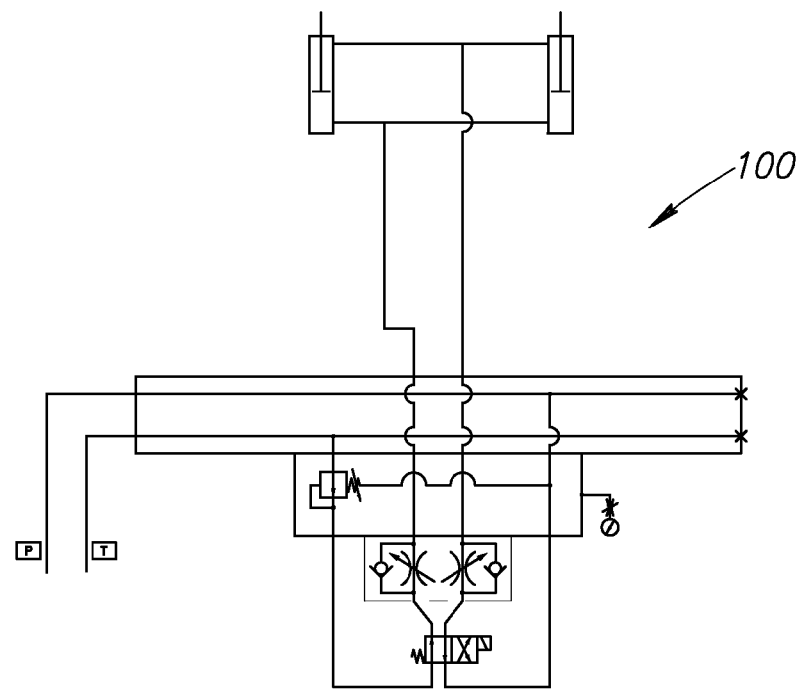
FIG. 4B is a diagram of the hydraulic control system.

Hydraulic lines (not shown) and valves (not shown) connect the first and second pairs of adjustable hydraulic legs 44, 44', 46, and 46' to the control center 48. Similarly, hydraulic lines (not shown) and valves (not shown) connect the hydraulic vertical supports 53 and 56 to the control center 48. Hydraulic lines (not shown) and valves (not shown) may be used to connect the hydraulic cylinders 81 and 86 to the control center 48. FIGS. 4A and 4B provide diagrams of an exemplary hydraulic control system 100 incorporated into the control center 48.

Referring to FIGS. 1 and 2, the length of the hydraulic legs 44, 44', 46, and 46' may be adjusted to position the bed 21 at a height suitable for inserting the forks 50 with the cargo 90 positioned thereupon through the opening 128 and placing the cargo 90 onto the floor 129 of the trailer 125 located adjacent to the rear end portion 14 of the frame 22. The length of the hydraulic legs 44, 44', 46, and 46' may be adjusted to substantially level the bed 21 and preferably make the bed 21 substantially co-planar with the floor 129 of the trailer 125. Then, the support legs 38 and 38' may be manually adjusted to reach the ground to provide additional support and stability. In this manner, the forks 50A-50C may move along both the bed 21 of the apparatus 10 and the floor 129 of the trailer 125 when loading cargo 90 into the trailer.

Operation

In embodiments in which the frame 22 is incorporated into the trailer 20, during operation, the apparatus 10 is delivered by a tractor (not shown) to a relatively flat loading site. For example, the apparatus 10 may be positioned on a level concrete, asphalt or compacted base surface. During transport, the carriage 65 is positioned on the front section 26 of the frame 22. The four hydraulic legs 44, 44', 46, and 46' on the trailer 20 are next adjusted in height so that the height of the bed 21 is substantially equal to the height of the trailer 125 located with its opening 128 adjacent to the rear end 14 of the frame 22. The four hydraulic legs 44, 44', 46, and 46' may also be used to level the bed 21 of the apparatus 10.

Optionally, the rear end portion 126 of the trailer 125 may be connected or coupled to the frame 22. The cargo 90 (e.g., pallets supporting goods) is loaded onto the forks 50A-50C. In embodiments including the extension assembly 54, the cargo 90 is positioned adjacent to and rearward of the extension assembly 54. Alternatively, the cargo 90 may be positioned adjacent to the ram surface 66 or may be spaced apart rearwardly therefrom.

When the cargo 90 to be loaded into the trailer 125 is on the forks 50A-50C, the motor 88 of the carriage 65 is activated to move the carriage 65 rearwardly over the bed 21 to push or otherwise force the forks 50A-50C and the cargo 90 supported thereby to slide along the bed 21 in general longitudinal alignment into the opening 128 of the trailer 125. Once the cargo 90 is inside the trailer 125, the forks 50A-50C must be removed therefrom.

Optionally, the apparatus 10 may include one or more sensor (e.g., limit switches) that detect when the carriage 65 is positioned adjacent the rear end portion 14 of the frame 22 and automatically trigger the positioning assembly 59 to raise the retention mechanisms 62 from the lowered/retracted position (see FIG. 23A) to the raised/retracted position (see FIG. 23B). Then, the cargo engagement assemblies 63 may automatically extend the engagement members 95 to place the retention mechanisms 62 in the raised/extended position (see FIG. 23C) with the engagement surface 96 of the engagement member 95 in engagement with a portion of the cargo 90 nearest the opening 128 with contact at a level near the floor 129 of the trailer 125.

In the raised/extended position, the retention mechanisms 62 block the cargo 90 from exiting the inside the trailer 125 as the forks 50A-50C are withdrawn. For example, the retention mechanisms 62 may be used to hold a last pallet inside the trailer 125. Then, the motor 88 of the carriage 65 is activated in the opposite direction to move the carriage 65 forwardly over the bed 21, pulling the forks 50A-50C out of the trailer 125 and out from under the cargo 90 as the retention mechanisms 62 hold the cargo inside the trailer 125. When the forks 50A-50C have been fully removed from the trailer 125 or no longer support the cargo 90, the retention mechanisms 62 may be returned to the raised/retracted position (see FIG. 23B) and then to the lowered/retracted position (see FIG. 23A) for storage. After the trailer 125 has been loaded with the cargo 90, the trailer 125 with its loaded cargo may be transported to a final destination Alternate Embodiment FIGS. 7A-7D illustrate an apparatus 300 that is an alternate embodiment of an apparatus for receiving the cargo 90 and transporting and/or loading that cargo into the trailer 125. Like reference numerals have been used to identify substantially identical components of the apparatus 10 and the apparatus 300.

Figure 7A:
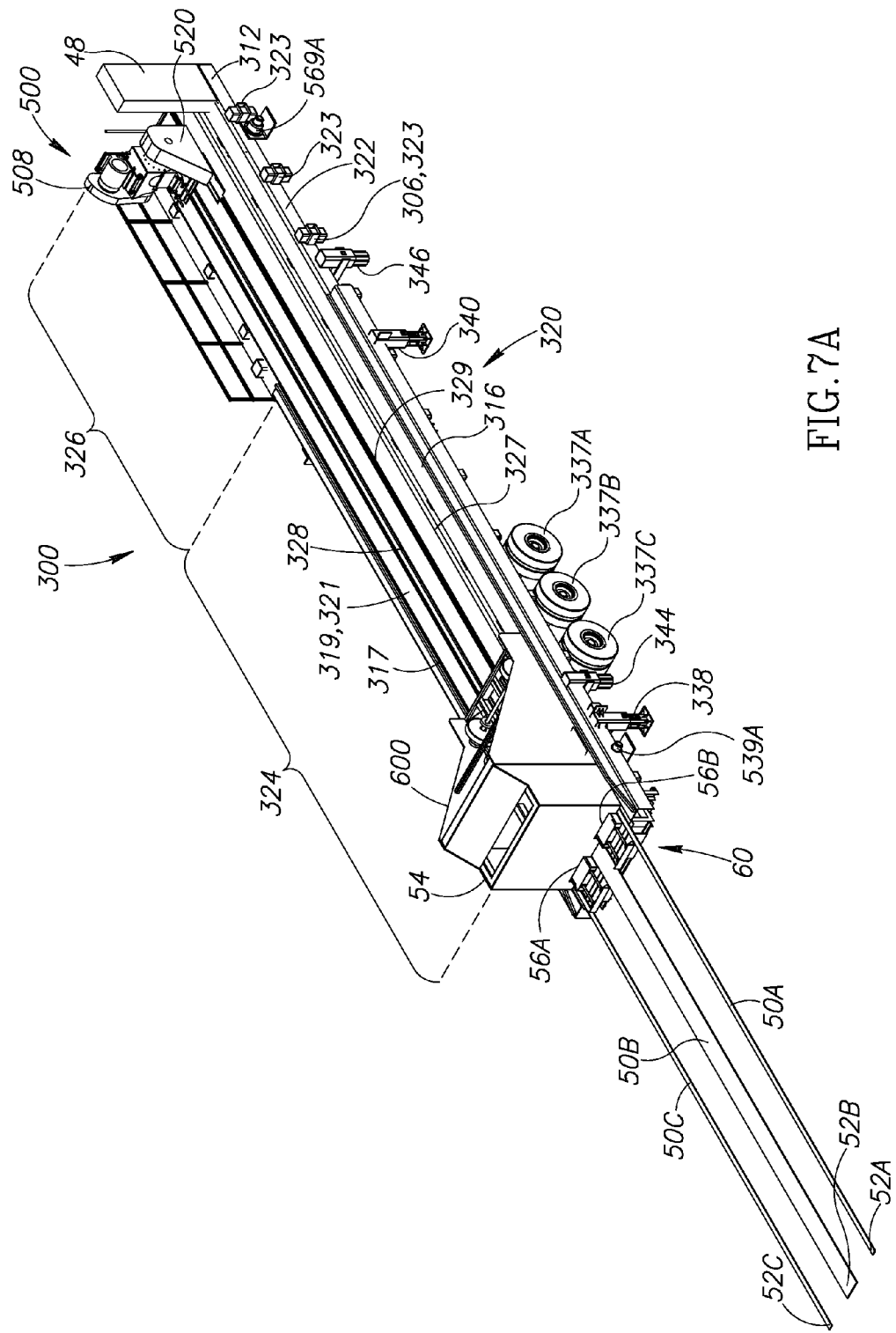
FIG. 7A is a perspective view of an alternate embodiment of a cargo loader apparatus depicted without its chains.

Turning to FIG. 7A, the apparatus 300 has an elongated frame 322 configured to support a generally rectangular-shaped bed 321. The frame 322 has a front end portion 312 opposite a rear end portion 314 (see FIG. 7B). Like the frame 22 of the apparatus 10 illustrated in FIGS. 1 and 2, the frame 322 may be incorporated into a height adjustable flat bed trailer 320 configured to be pulled behind a semi tractor (not shown). However, this is not a requirement and embodiments in which the apparatus 300 is configured to remain in a stationary position are within the scope of the present teachings. The trailer 320 is selectively couplable by the front end portion 312 of the frame 322 to the tractor to be pulled thereby.

Optionally, the rear end portion 314 of the frame 322 may be selectively couplable to the rear portion 126 of the trailer 125 to be loaded with cargo 90 when the apparatus 300 is transferring the cargo into the opening 128 of the rear portion 126 of the trailer 125.

Frame 322

Figure 10:
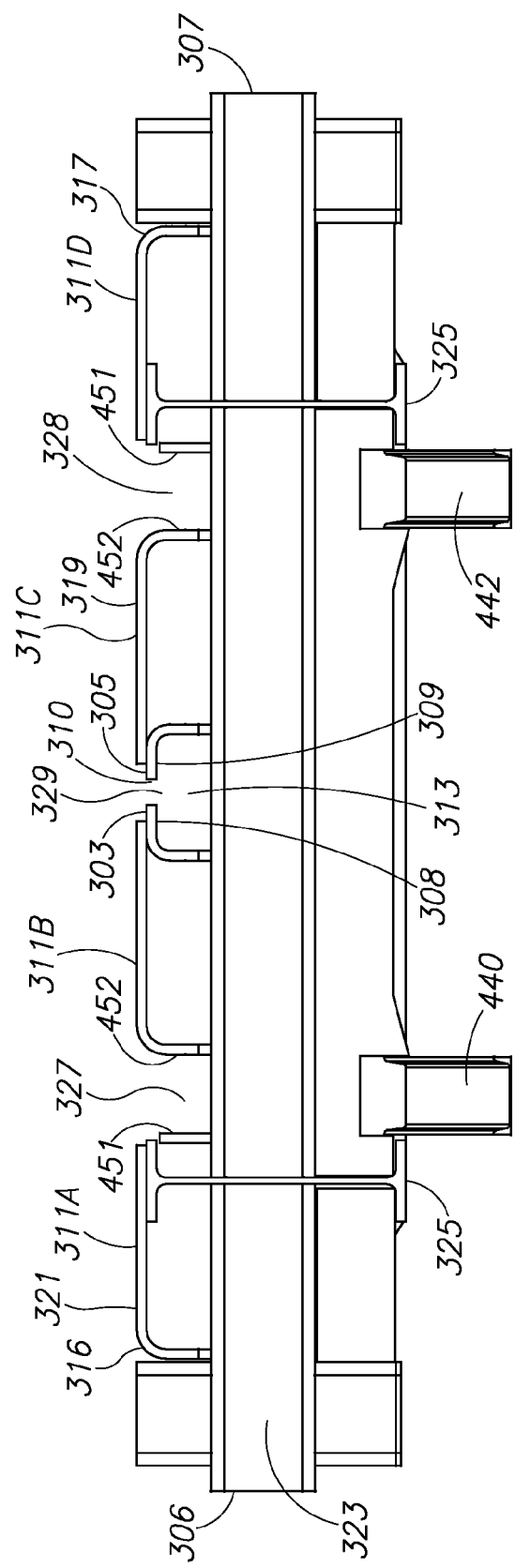
FIG. 10 is an enlarged lateral cross-sectional view of the bed and frame of the cargo loader apparatus of FIG. 7A.

The frame 322 includes a plurality of lateral support members 323 coupled to a plurality of longitudinal support members 325 (see FIG. 10). The lateral support members 323 are longitudinally spaced from one another and extend laterally under the bed 321. The lateral support members 323 provide support to the underside of the bed 321 as well as attachment points for various other components of the apparatus 300. The longitudinal support members 325 (see FIG. 10) are laterally spaced apart from one another, extend underneath the bed 321, and provide attachment points for various other components of the apparatus 300. Referring to FIG. 7D, the elongated frame 322 has a first longitudinally extending side portion 306 opposite a second longitudinally extending side portion 307.

The frame 322 has a rear section 324 opposite a front section 326. In the embodiment depicted, the rear section 324 is longer than the front section 326. The length of the rear section 324 may be determined at least in part by the length of the cargo hauling portion of the trailer 125 (see FIG. 7B). By way of a non-limiting example, the rear section 324 may have a length of about 60 feet.

In embodiments in which the frame 322 is incorporated into the trailer 320, one or more wheel and axle assemblies 337A-337C are rotatably mounted on the rear section 324 and extend laterally under the bed 321. As may best be viewed in FIG. 8, a first pair of manually adjustable support legs 338 and 338' may be mounted to the rear section 324, one on each of the side portions 306 and 307, respectively, of the frame 322 between the wheel and axle assembly 337C (see FIG. 7A) and the rear end portion 314 (see FIG. 7A) of the frame 322. As may best be viewed in FIG. 9, a second pair of manually adjustable support legs 340 and 340' is mounted to the rear section 324. Referring to FIG. 7A, the adjustable support leg 340 is mounted on the side portion 306 of the frame 322 between the wheel and axle assembly 337A and the front section 326 of the frame 322. Referring to FIG. 7D, the adjustable support leg 340' is mounted on the side portion 307 of the frame 322 between the wheel and axle assembly 337A and the front section 326 of the frame 322.

Returning to FIG. 8, in the embodiment depicted in the drawings, the first pair of manually adjustable support legs 338 and 338' is spaced from the rear end portion 314 (see FIG. 7B) of the frame 322 by a distance approximately equivalent to a distance that the second pair of manually adjustable support legs 340 and 340' (see FIG. 9) is spaced from the front section 326 of the frame 322. Thus, the center of the rear section 324 is located approximately midway between the first pair of manually adjustable support legs 338 and 338' and the second pair of manually adjustable support legs 340 and 340'.

Figure 7B:
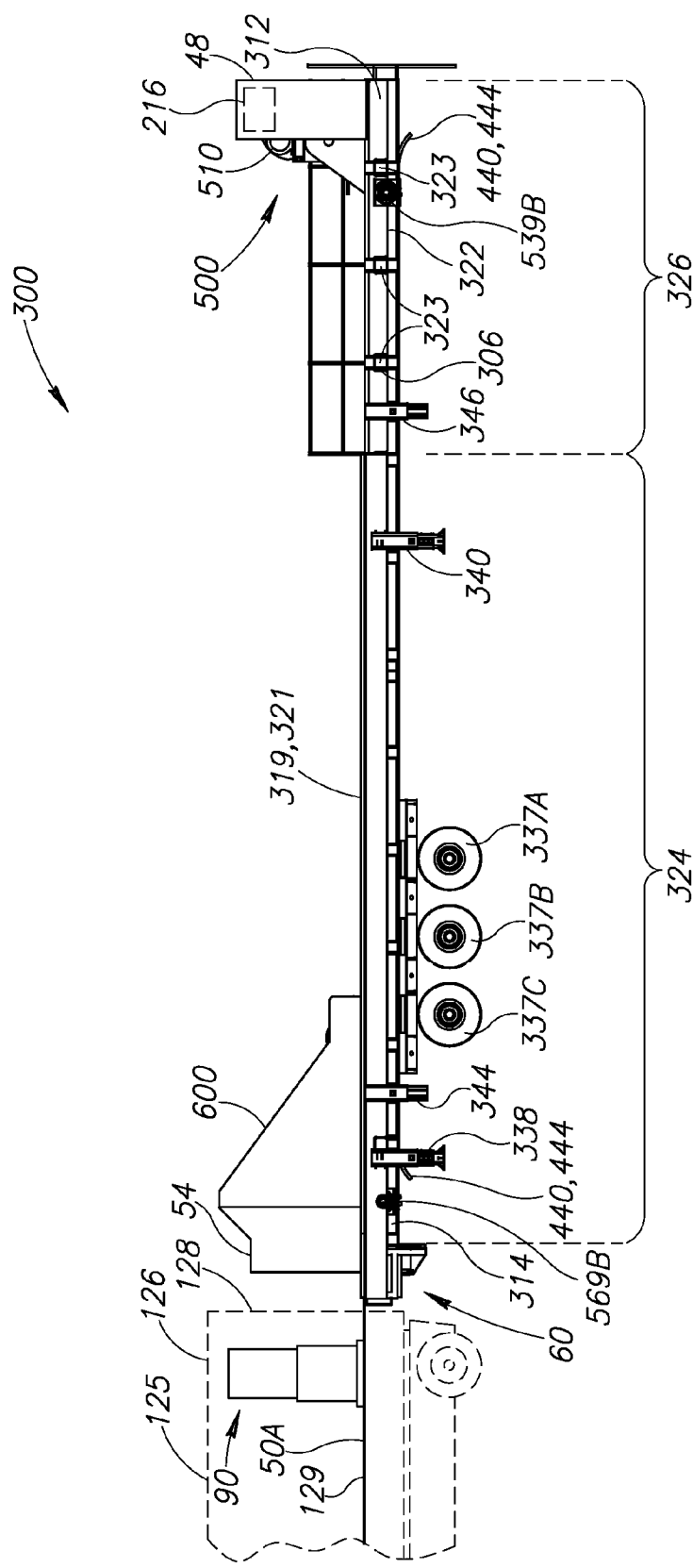
FIG. 7B is a side view of the cargo loader apparatus of FIG. 7A depicted without its chains and loading cargo into an adjacent a trailer.
Figure 7C:
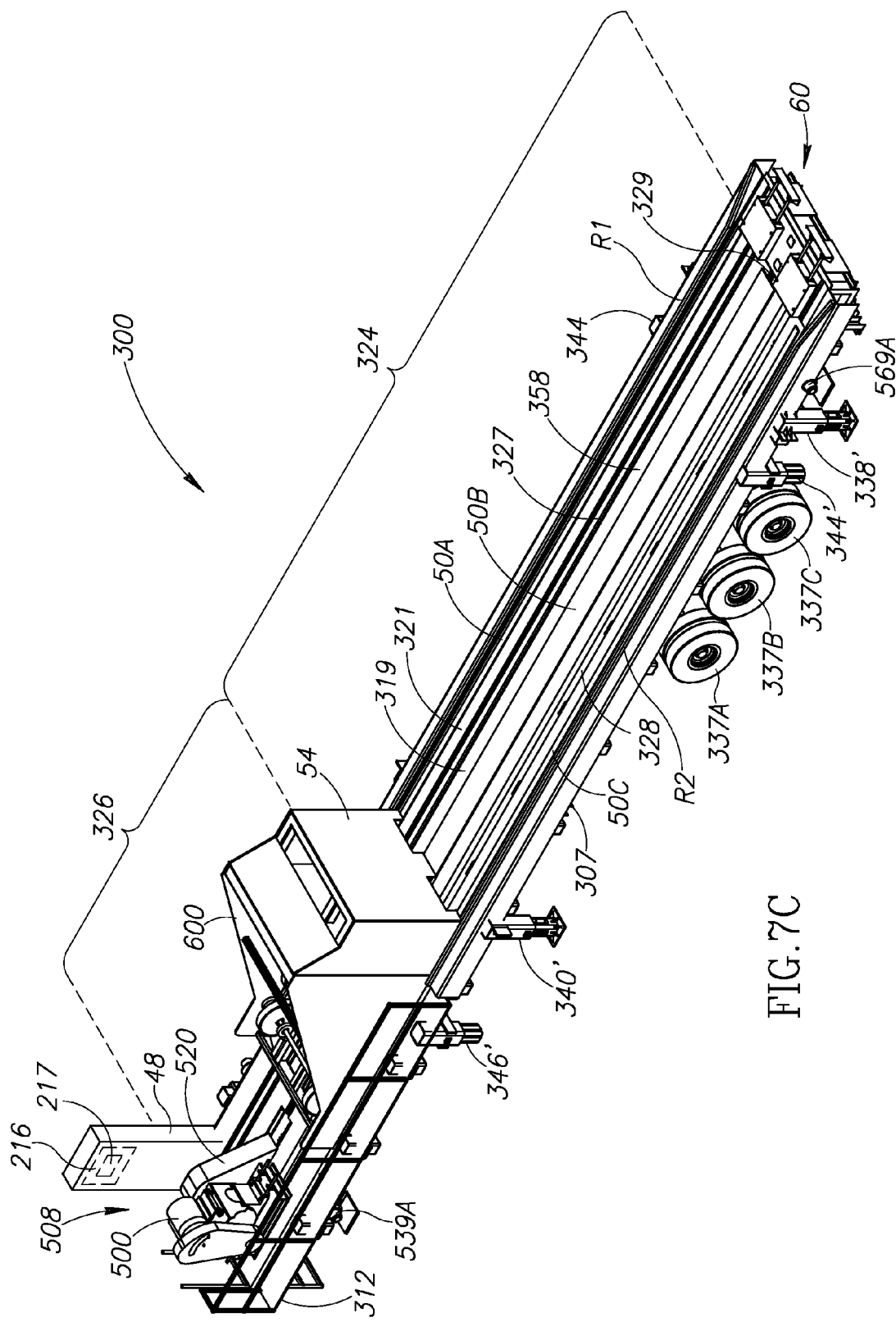
FIG. 7C is a perspective view of the cargo loader apparatus of FIG. 7A depicted without its chains and with its carriage positioned on a front portion of a bed in a cargo receiving position.
Figure 7D:
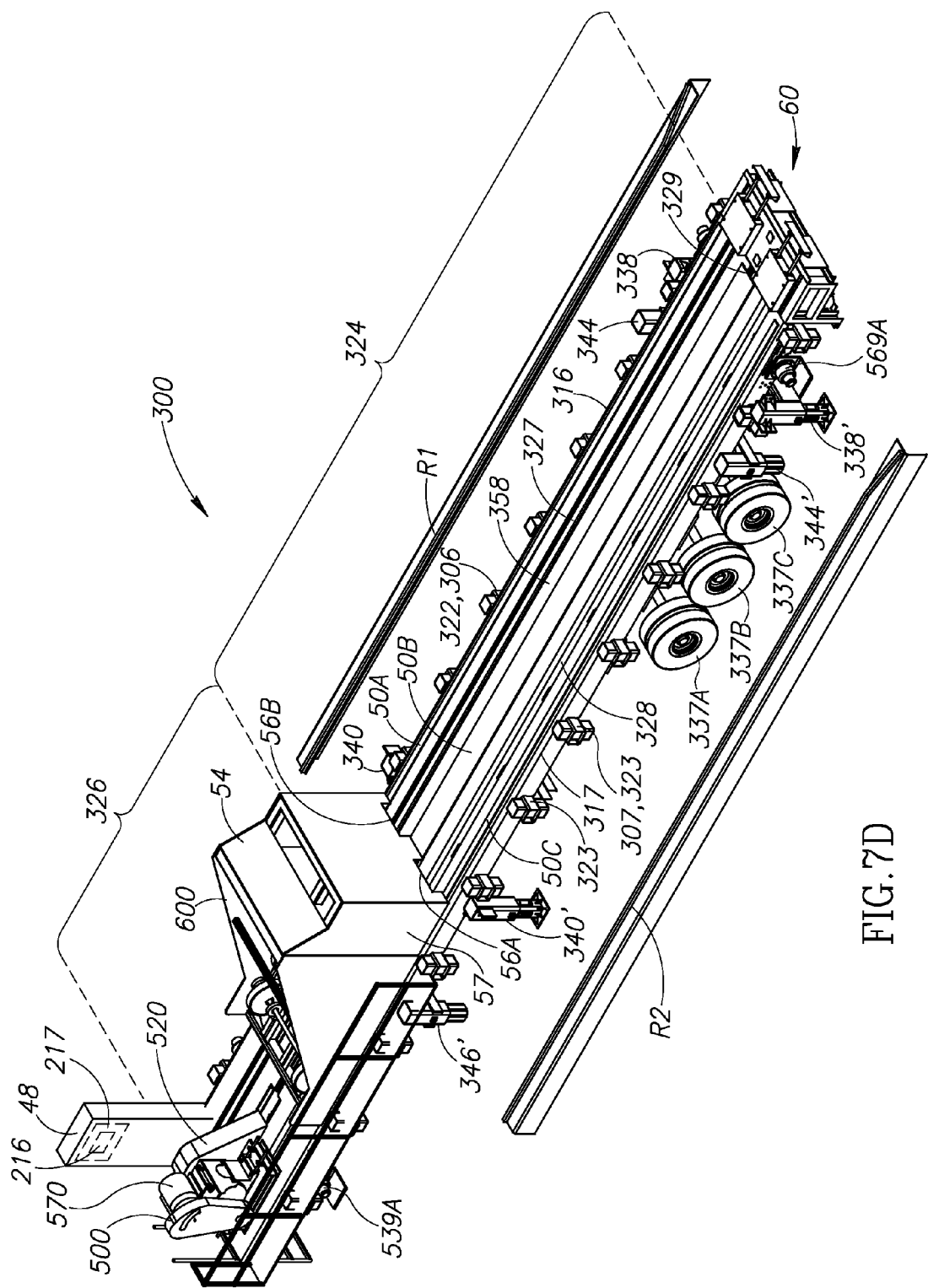
FIG. 7D is a perspective partially exploded view of the cargo loader apparatus of FIG. 7C depicted with its side rails shown separated from the apparatus.
Figure 8:
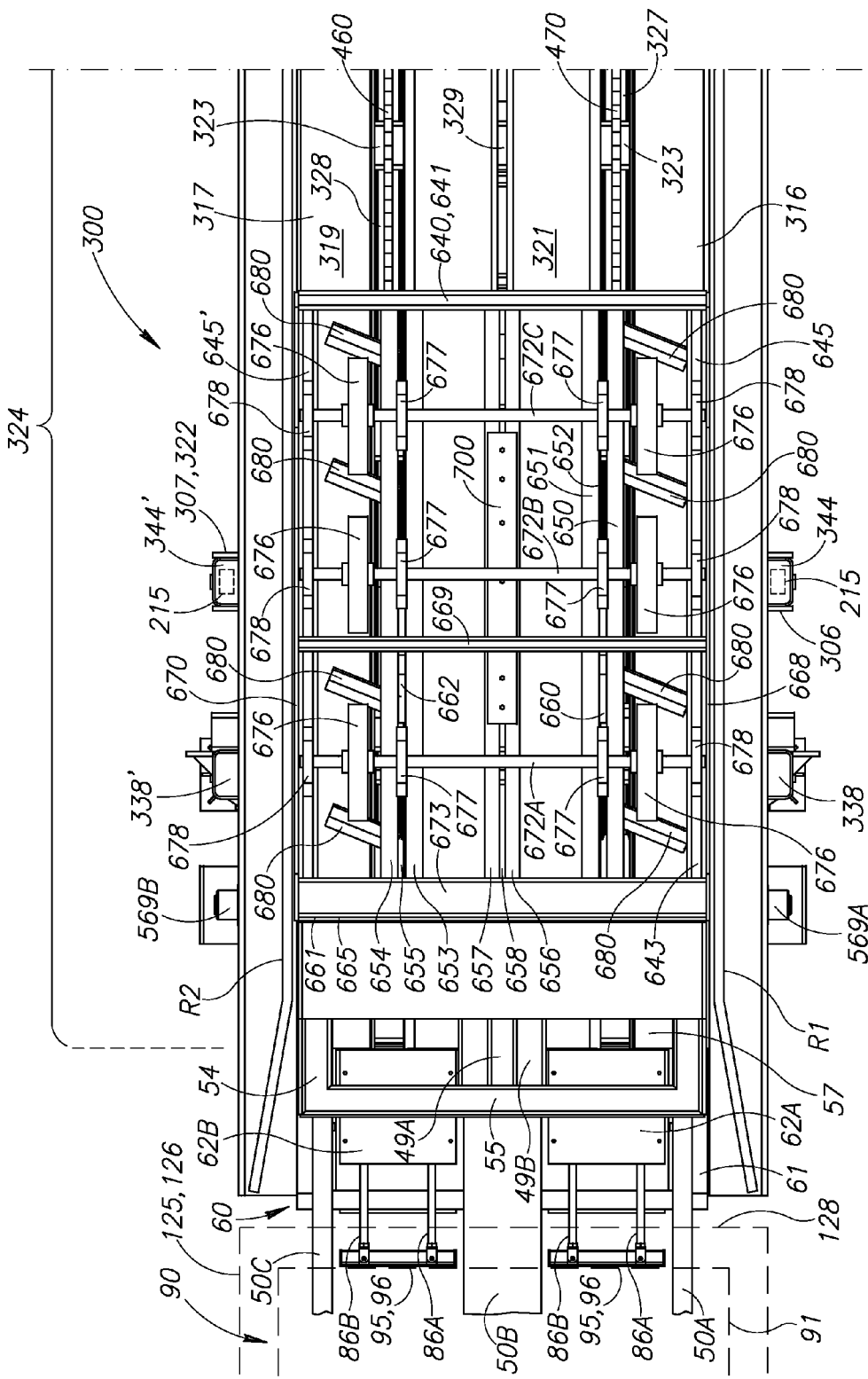
FIG. 8 is an enlarged top plan view of a rear portion of the cargo loader apparatus of FIG. 7A depicted with its chains, with its carriage positioned on the rear portion of a bed in a cargo loading position, and with retention mechanisms of a cargo retention assembly positioned in a raised/extended position.
Figure 9:
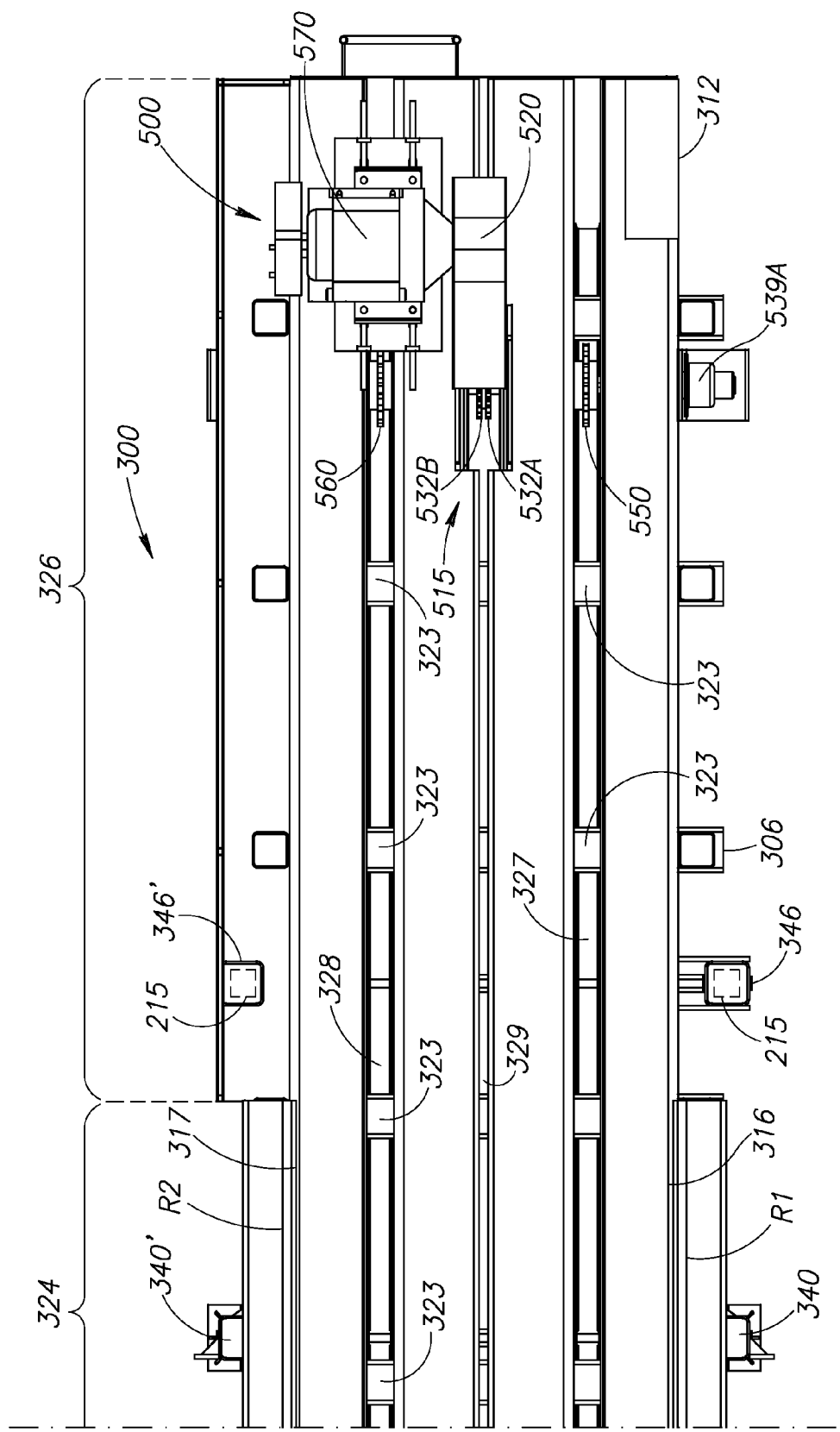
FIG. 9 is an enlarged top plan view of a front portion of the cargo loader apparatus of FIG. 7A depicted without its chains.

Turning to FIGS. 8 and 7D, a first pair of adjustable hydraulic legs 344 and 344' is attached to the rear section 324, one on each of the side portions 306 and 307, respectively, of the frame 322 between the wheel and axel assembly 337C and the first pair of manually adjustable support legs 338 and 338'. Turning to FIG. 9, a second pair of adjustable hydraulic legs 346 and 346' is attached to the front section 326. The hydraulic leg 346 is positioned on the side portion 306 of the frame 322 toward the rearward portion of the front section 326. Referring to FIG. 7D, the hydraulic leg 346' is positioned on the side portion 307 of the frame 322 toward the rearward portion of the front section 326.

In embodiments in which the frame 322 is incorporated into the trailer 320, the tractor king pin 42 (see FIG. 1) is mounted to the underside of the front section 326. When the trailer 320 is pulled behind the tractor, the tractor king pin 42 is attached to the fifth wheel coupling on the tractor and the wheel and axel assemblies 337A-337C are disposed on the ground. To decouple the trailer 320 from the tractor, the hydraulic legs 344, 344', 346, and 346' are lowered to the ground. Then, the tractor king pin 42 is detached from the fifth wheel coupling and the tractor driven forward and away from the trailer 320. Thus, the trailer 320 is supported on the ground by the hydraulic legs 344, 344', 346, and 346' and the wheel and axle assemblies 337A-337C.

As will be described in more detail below, referring to FIGS. 7A-7C, the length of the hydraulic legs 344, 344', 346, and 346' may be decreased or increased to lower or raise the bed 321 to a desired height needed to load or slide the forks 50A-50C with the cargo 90 thereupon along the bed 321 and through the opening 128 in the trailer 125 located at the rear end portion 314 of the frame 322. Further, the lengths of the hydraulic legs 344, 344', 346, and 346' may be adjusted to level the bed 321.

Each of the hydraulic legs 344, 344', 346, and 346' may include a housing mounted to the frame 322 and a movable ram (not shown). Referring to FIGS. 8 and 9, each of the hydraulic legs 344, 344', 346, and 346' may include a load sensor 215 inside the housing, the sensor being couplable to a scale unit 216 (see FIG. 7B) and configured to send an electronic signal indicating the amount of weight supported by the leg. The scale unit 216 may include a user interface or display 217 (see FIG. 7C). The sensors 215 each send an electronic signal to the scale unit 216, which the scale unit interprets to produce one or more weight measurements. For example, the scale unit 216 may produce a front weight measurement using the signals received from the sensors 215 for the hydraulic legs 346 and 346', and a rear weight measurement using the signals received from the sensors for the hydraulic legs 344 and 344'. Alternatively, the scale unit 216 may produce a weight measurement for each of the hydraulic legs 344, 344', 346, and 346'. By way of another example, the scale unit 216 may produce a single weight measurement based on all of the signals received from the hydraulic legs 344, 344', 346, and 346'. The weight measurement(s) may be displayed to an operator of the apparatus 300 using the scale unit's display 217.

Alternatively, a gauge (not shown) may be coupled to each supply line supplying hydraulic pressure to the hydraulic legs 344, 344', 346, and 346'. The gauges may display the pressure in the air supply lines. The operator may use the values displayed by the gauges to determine one or more weight measurements using mathematical formulas known in the art.

Referring to FIG. 7B, the cargo retention assembly 60 is coupled to the rear end portion 314 of the frame 322. Referring to FIG. 8, after the forks 50A-50C and the cargo 90 carried by the forks have been positioned inside the trailer 125, the cargo retention assembly 60 engages a portion of the cargo 90 adjacent the opening 128 and holds the cargo inside the trailer 125 as the forks 50A-50C are withdrawn from the trailer 125. As the forks 50A-50C are withdrawn, portions of the cargo 90 sequentially slide off the free distal ends 52A-52C (see FIG. 7A) of the forks 50A-50C and onto the floor 129 of the trailer 125.

Bed 321

Figure 15A:
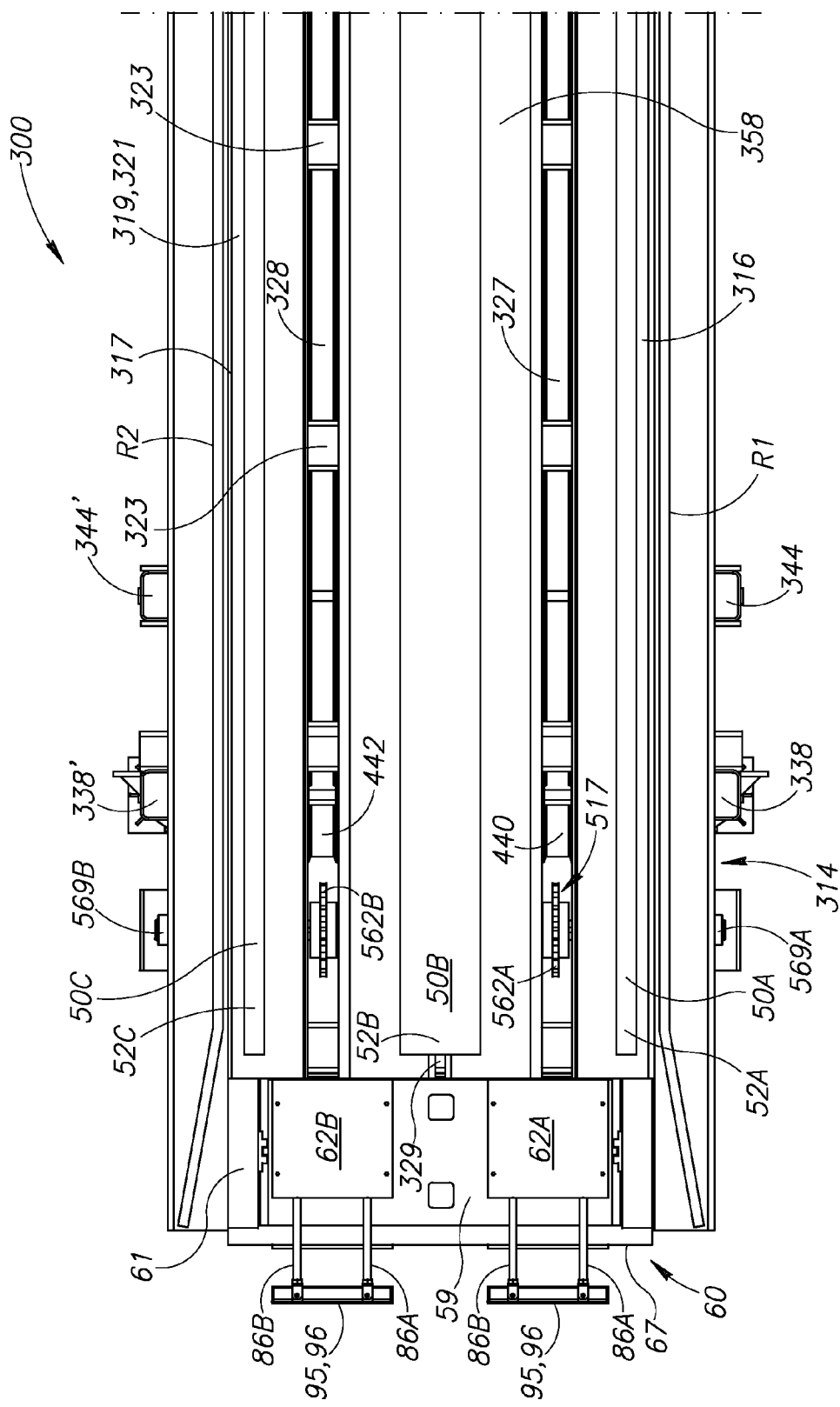
FIG. 15A is an enlarged top plan view of the rear portion of the cargo loader apparatus of FIG. 7C depicted without its chains, with its carriage positioned on the front portion of a bed in a cargo receiving position, and with retention mechanisms of a cargo retention assembly positioned in a raised/extended position.
Figure 15B:
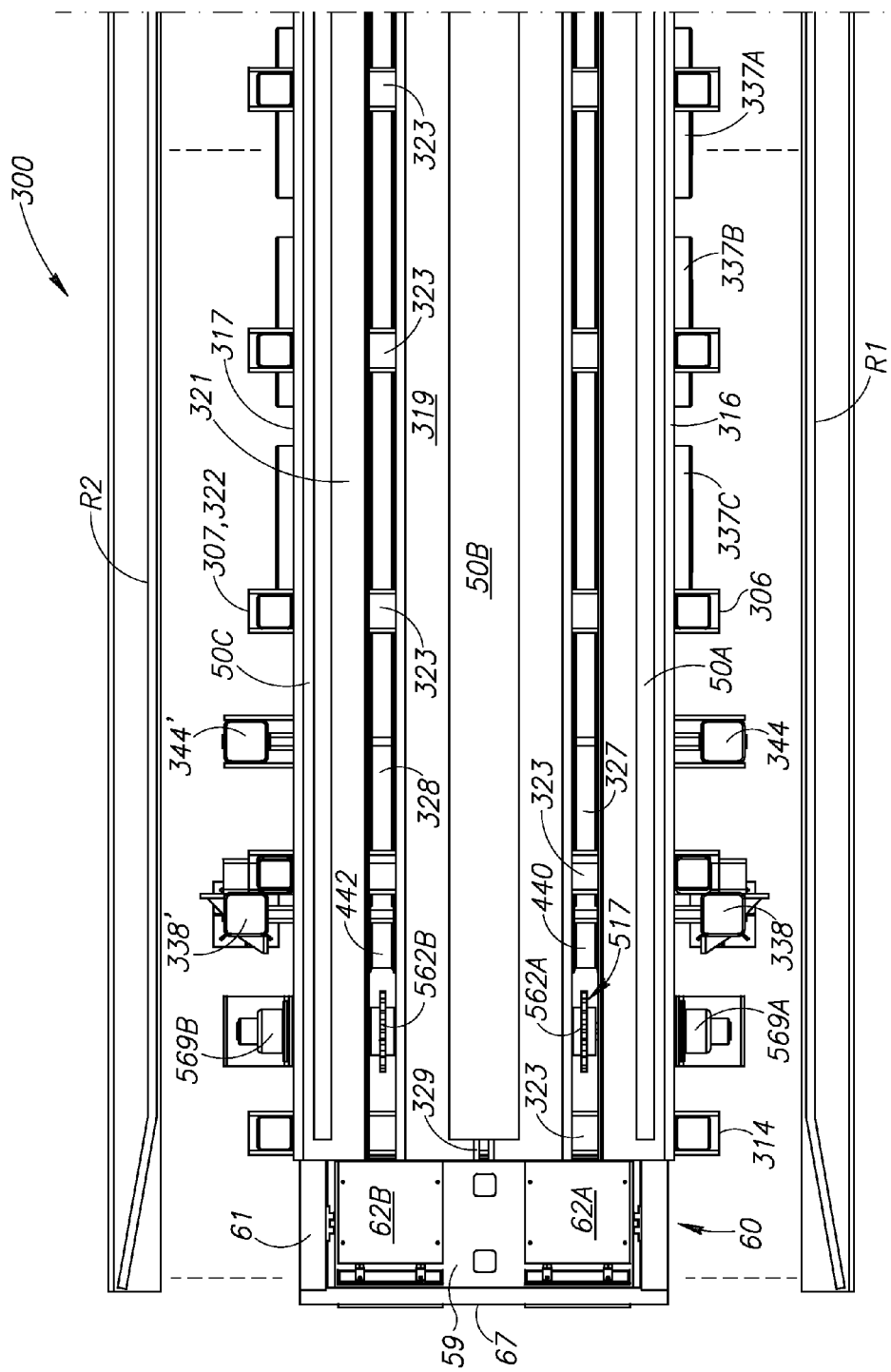
FIG. 15B is an enlarged partially exploded top plan view of the rear portion of the cargo loader apparatus of FIG. 15A depicted with its side rails shown separated from the apparatus.

Turning to FIG. 15B, the bed 321 has a first longitudinal side portion 316, which is adjacent the side portion 306 of the frame 322, located opposite a second longitudinal side portion 317, which is adjacent the side portion 307 of the frame 322. The bed 321 includes a substantially planar upper surface 319.

In the embodiment depicted in FIG. 10, the bed 321 is constructed from four elongated laterally spaced deck plates 311A, 311B, 311C, and 311D mounted to the frame 322. The deck plate 311A is adjacent the first side portion 316 of the bed 321 and the deck plate 311D is adjacent the second side portion 317 of the bed 321. Three laterally spaced apart longitudinally extending channels, a first chain guide channel 327, a second chain guide channel 328, and a center channel 329, are defined between the deck plates 311A, 311B, 311C, and 311D and traverse the length of the bed 321. The center channel 329 is located between the first and second chain guide channels 327 and 328. The first chain guide channel 327 is defined between the deck plate 311A and the deck plate 311B. The second chain guide channel 328 is defined between the deck plate 311C and the deck plate 311D. The center channel 329 is defined between the deck plate 311B and the deck plate 311C.

Referring to FIG. 8, the first chain guide channel 327 is configured to guide a first chain 450 and the second chain guide channel 328 is configured to guide a second chain 460 longitudinally along the bed 321. For illustrative purposes, the chains 450 and 460 have been omitted from all of the figures except FIG. 8. Each of the chains 450 and 460 extends from the front end portion 312 (see FIG. 9) of the frame 322 to the rear end portion 314 and back again to the front end portion 314 (see FIG. 7B) in a continuous loop. Thus, only a first portion or upper run of the chains 450 and 460 is located within the chain guide channels 327 and 328 near the surface 319 of the bed 321.

Returning to FIG. 10, the chain guide channels 327 and 328 each include a pair of spaced apart sidewalls 451 and 452 configured to maintain the chains 450 and 460 laterally within the channels 327 and 328, respectively. By way of a non-limiting example, the lateral distance between the sidewalls 451 and 452 may be about one inch greater than the width of each of the chains 450 and 460. Each of the chain guide channels 327 and 328 is open along the surface 319 of the bed 321 to provide access from above to each of the chains 450 and 460.

While the apparatus 300 is depicted as including two chains 450 and 460, those of ordinary skill in the art appreciate that the apparatus may be configured to use a single chain or more than two chains, and such embodiments are within the scope of the present teachings.

The center channel 329 includes a pair of inwardly extending longitudinally aligned juxtaposed flanges 303 and 305 spaced from the surface 319 of the bed 321. A slot 310 substantially similar to the slot 172 (see FIG. 6) of the apparatus 10 is defined between the flanges 303 and 305. The center channel 329 is in communication with a void or chamber 313 located below the deck plates 311B and 311C via the slot 310. Each of the flanges 303 and 305 has a lower surface 308 and 309 defining an upper portion of the chamber 313.

Below each of the first and second chain guide channels 327 and 328 is a return chain guide 440 and 442, respectively. The return chain guides 440 and 442 are coupled to the frame 322 under the bed 321. A second portion or lower run of the chains 450 and 460 is located within the return chain guides 440 and 442 below the bed 321. Referring to FIG. 7B, the return chain guides 440 and 442 may each include downward curving end portions 444 through which the chains 450 and 460 exit the return chain guides 440 and 442.

Referring to FIGS. 7C and 7D, optionally, the first guide rail "R1" may be positioned alongside the bed 321 on the first longitudinal side portion 316 and the second guide rail "R2" may be positioned alongside the bed 321 on the second longitudinal side portion 317. The first and second guide rails "R1" and "R2" may be attached to the frame 322 and/or the bed 321. The first and second guide rails "R1" and "R2" define a longitudinally extending channel or passageway 358 therebetween. The first and second guide rails "R1" and "R2" help maintain the cargo 90 (see FIG. 7B) on the bed 321 as the cargo is loaded onto the forks 50A-50C and/or loaded by the apparatus 300 onto the trailer 125 (see FIG. 7B).

Rotational Drive Assembly 500

Turning to FIG. 7A, a rotational drive assembly 500 is rotatably coupled to each of the chains 450 and 460 (see FIG. 8) to drive them. When driven, the first and second chains 450 and 460 travel in the same direction within the chain guide channels 327 and 328, respectively. The chains 450 and 460 are supported by and travel on the plurality of lateral support members 323, exposed by the chain guide channels 327 and 328. In alternate embodiments, the channels 327 and 328 may have closed portions that support the chains 450 and 460.

Figure 20:
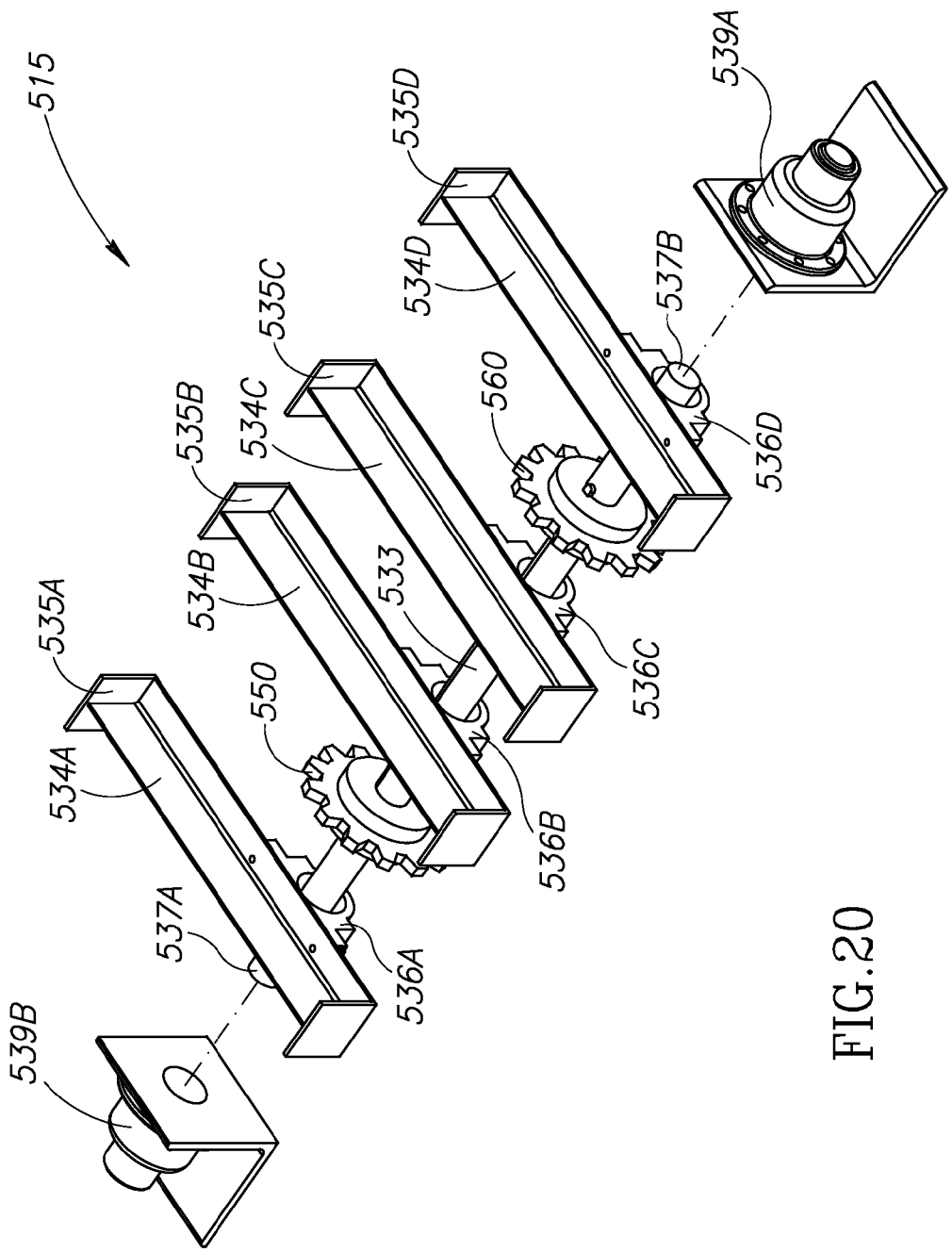
FIG. 20 is a perspective view of an alternate embodiment of a front drive assembly to be located under the front portion of the bed.

In a first embodiment, the rotational drive assembly 500 is affixed to the surface 319 of the bed 321. In a second embodiment (described below), the rotational drive assembly 500 includes a first pair of motors 569A and 569B (see FIG. 21) affixed to the frame 322 at locations below the surface 319 of the bed 321. Optionally, the second embodiment (described below) of the rotational drive assembly 500 may include a second pair of motors 539A and 539B (see FIG. 20) affixed to the frame 322 at locations below the surface 319 of the bed 321. In both the first and second embodiments of the drive assembly 500, when the upper run of the chains 450 and 460 (see FIG. 8) are driven within the chain guide channels 327 and 328 toward the rear end portion 314 (see FIG. 7B) of the frame 322, the return chain guides 440 and 442 (see FIG. 10) located below the bed 321 guide the lower run of the chains 450 and 460 back to the drive assembly 500. The reverse occurs when the upper run of the chains 450 and 460 are driven toward the front end portion 312 of the frame 322.

FIGS. 7A-7D, 8, 9, 15A, and 15B illustrate the apparatus as including the components of both the first and second embodiments of the rotational drive assembly 500. However, this is not a requirement. Through application of ordinary skill in the art to the present teachings, an embodiment of the apparatus 300 may be constructed that includes only the components of either the first embodiment or the second embodiment of the rotational drive assembly 500.

Figure 11:
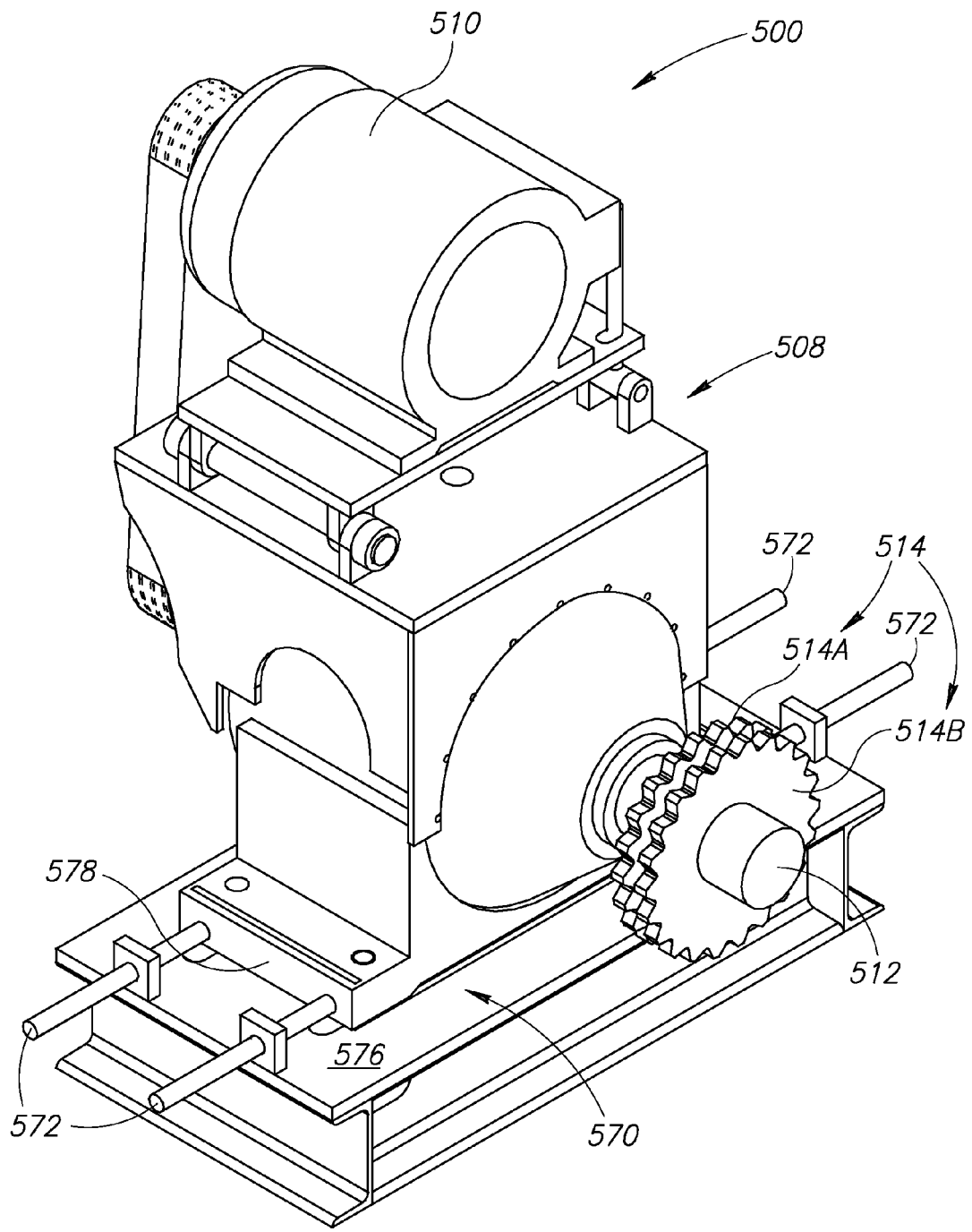
FIG. 11 is a perspective view of an electric motor portion of a drive assembly of the cargo loader apparatus of FIG. 7A.

As may best be viewed in FIG. 11, in the first embodiment of the drive assembly 500, the rotational drive assembly 500 includes a motor assembly 508 having a motor 510 coupled to and configured to rotate a drive shaft 512. The motor 510 may include any suitable motor known in the art, including an electric motor, a hydraulic motor, and the like. In the embodiment depicted in FIG. 11, a pair of sprockets 514A and 514B are coupled to the drive shaft 512. The sprockets 514A and 514B are referred to collectively by reference numeral 514. If desired, fewer or more sprockets may be used.

Figure 12:
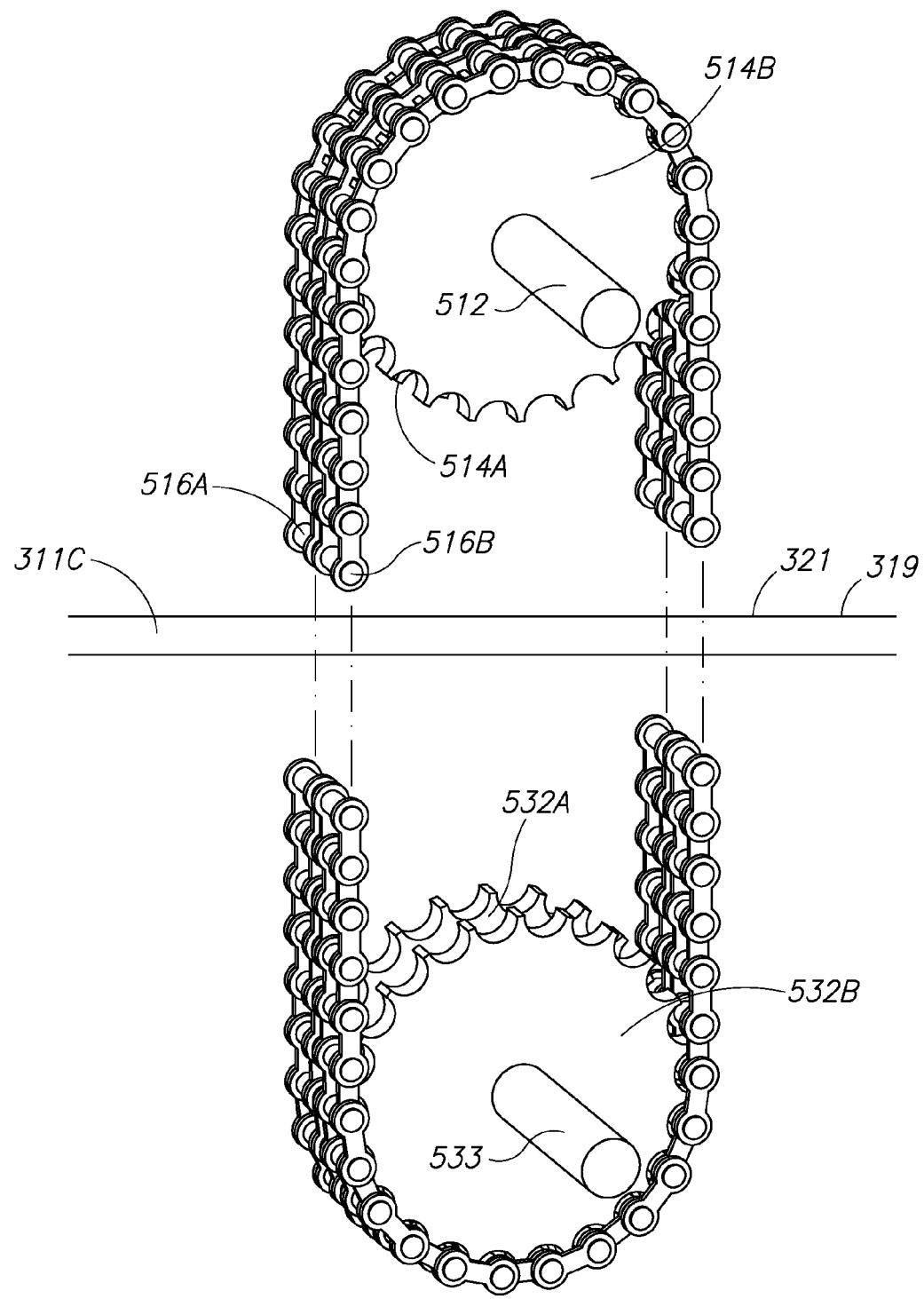
FIG. 12 is a perspective view of a linkage between the electric motor portion of the drive assembly of FIG. 11 and a front drive assembly located under the bed.

Referring to FIG. 12, one or more chains 516 are coupled to the sprockets 514A and 514B and driven thereby. For illustrative purposes, separate chains 516A and 516B are shown coupled to the sprockets 514A and 514B, respectively; however, this is not a requirement. The chains 516A and 516B extend from the sprockets 514A and 514B, respectively, located above the surface 319 of the bed 321 downwardly through the center channel 329. The rotational drive assembly 500 may include an optional guard 520 (see FIGS. 7A and 9) configured to encase the sprockets 514A and 514B and at least a portion of the chains 516A and 516B.

Figure 13:
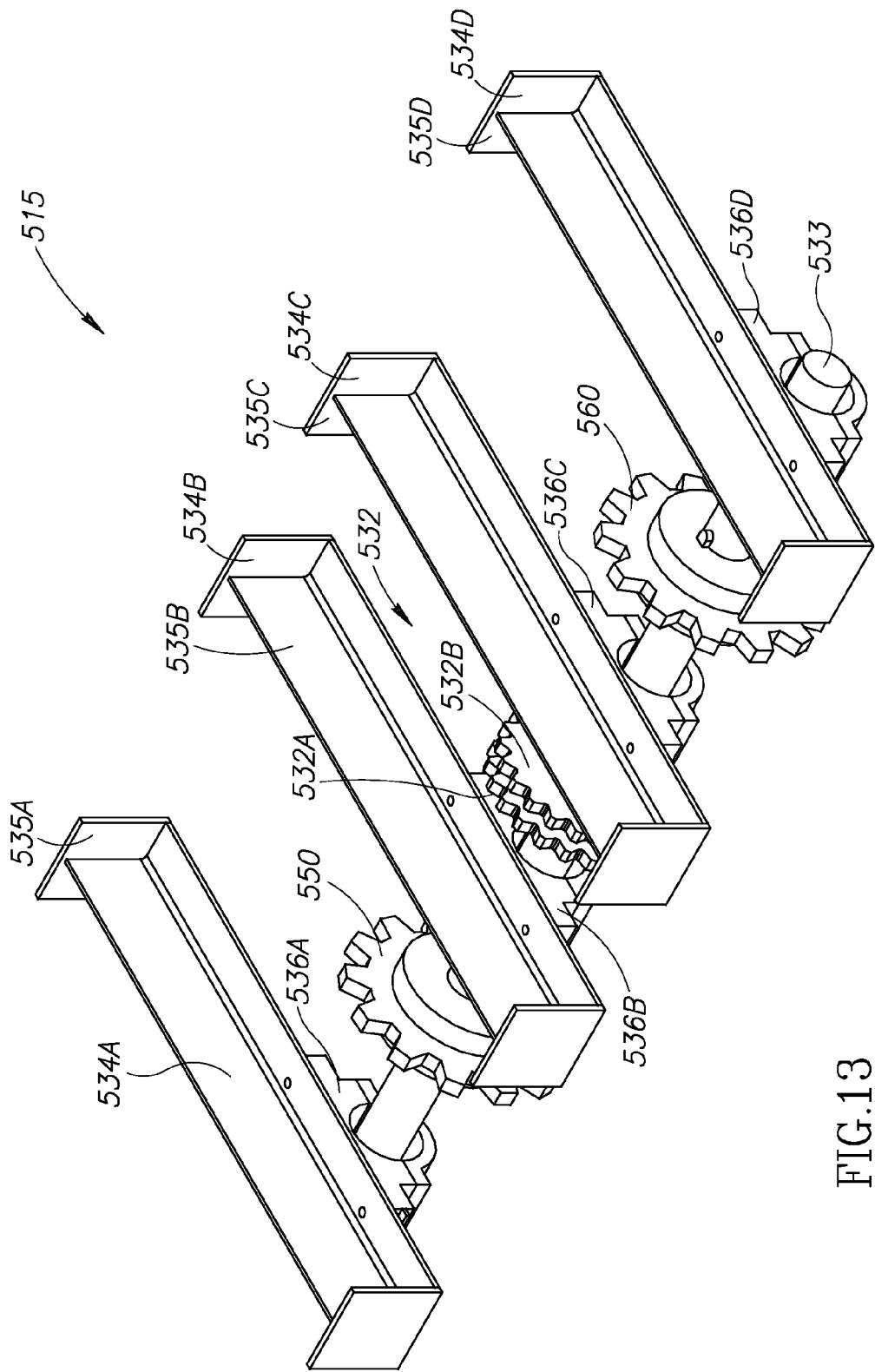
FIG. 13 is a perspective view of the front drive assembly located under the front portion of the bed.

As mentioned above, the chains 516A and 516B extend from the sprockets 514A and 514B located above the surface 319 of the bed 321 downwardly through the center channel 329. Referring to FIGS. 12 and 13, the rotational drive assembly 500 includes a front drive assembly 515 mounted to the front portion 326 of the frame 322 under the bed 321. The front drive assembly 515 includes at least one sprocket 532 mounted to at least one drive shaft 533 and on which the chains 516A and 516B are entrained. For illustrative purposes, each of the chains 516A and 516B is shown coupled to a separate sprocket 532A and 532B; however, this is not a requirement. Thus, in the embodiment described, the sprocket 514A drives the chain 516A that in turn drives the sprocket 532A and the sprocket 514B drives the chain 516B that in turn drives the sprocket 532B. For illustrative purposes, it is assumed that the sprockets 532A and 532B are coupled to a single continuous drive shaft 533. However, this is not a requirement and embodiments in which the sprockets 532A and 532B are each coupled to separate drive shafts are within the scope of the present teachings.

As illustrated in FIGS. 9 and 13, the front drive assembly 515 includes a first sprocket 550 mounted on the drive shaft 533 and aligned with the first chain guide channel 327 and configured to engage the first chain 450 (see FIG. 8). The first chain 450 is looped around the first sprocket 550, which imparts a drive force thereto causing the upper run of the chain 450 to selectively move in the first chain guide channel 327 either toward or away from the rear end portion 314 (see FIG. 7B) of the frame 322.

The front drive assembly 515 includes a second sprocket 560 mounted on the drive shaft 533 and aligned with the second chain guide channel 328, and configured to engage the second chain 460. The second chain 460 is looped around the second sprocket 560, which imparts a drive force thereto causing the upper run of the chain 460 to move in the second chain guide channel 328 in the same first direction in which the first chain 450 is moving in the first chain guide channel 327.

The drive shaft 533 is rotatably mounted to the frame 322 by a plurality of spaced apart framing members 534A, 534B, 534C, and 534D that are each coupled by their upper portions 535A, 535B, 535C, and 535D, respectively, to the frame 322. Each of the framing members 534A, 534B, 534C, and 534D includes a bearing assembly 536A, 536B, 536C, and 536D, respectively, configured to house a portion of the drive shaft 533 and permit it to rotate relative to the frame 322.

In the embodiment depicted, the framing member 534A is adjacent the side portion 316 of the bed 321 and the framing member 534D is adjacent the side portion 317 of the bed 321. The framing member 534B is located between the sprocket 550 and the sprocket 532A. The framing member 534C is located between the sprocket 560 and the sprocket 532B. Thus, the bearing assemblies 536A and 536D rotatably retain portions of the drive shaft 533 located at the ends of the drive shaft 533. The bearing assembly 536B rotatably retains a portion of the drive shaft 533 located between the sprocket 550 and the sprocket 532A, and the bearing assembly 536C rotatably retains a portion of the drive shaft 533 located between the sprocket 560 and the sprocket 532B.

Figure 14:
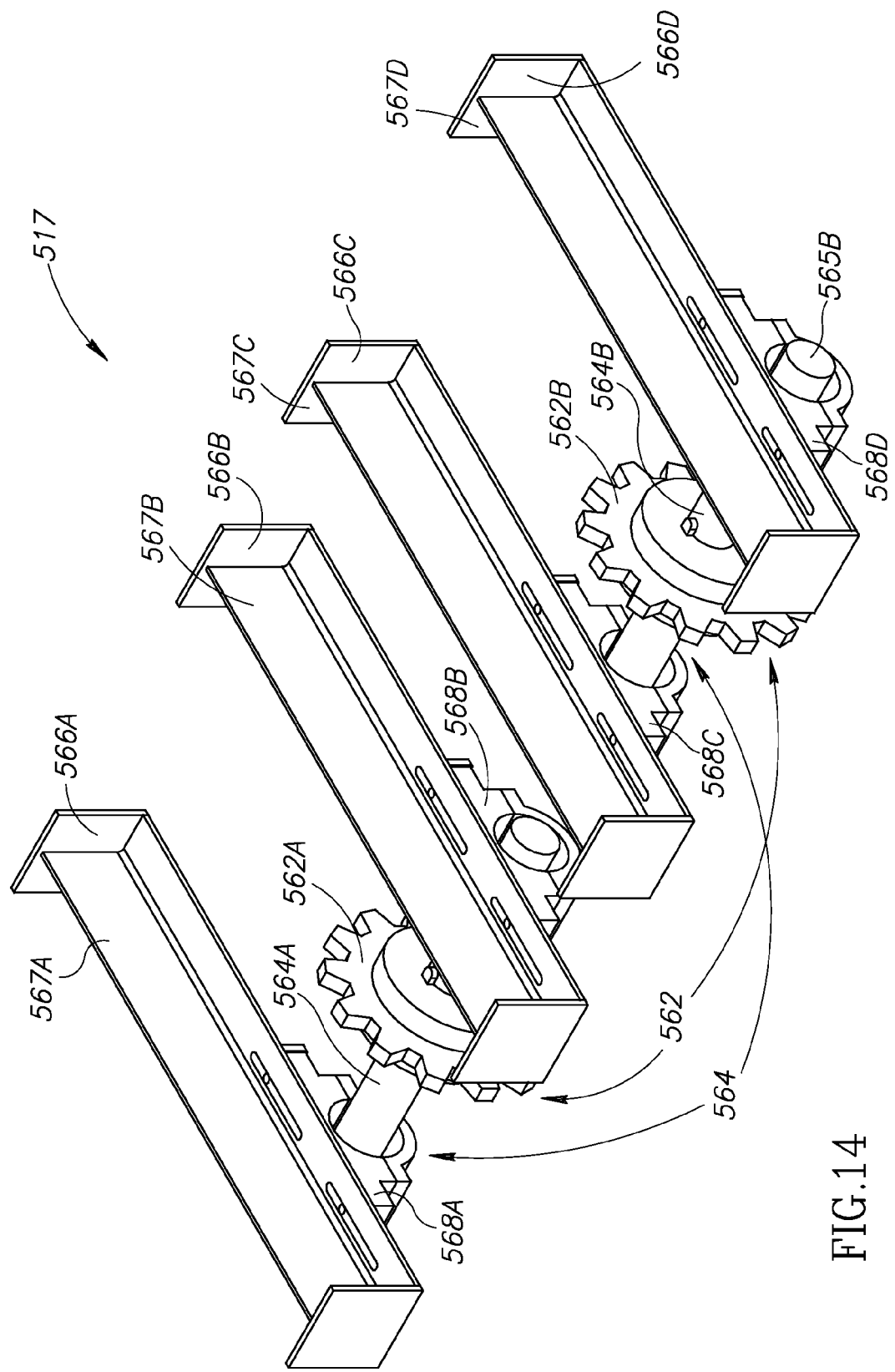
FIG. 14 is a perspective view of the rear drive assembly located under the rear portion of the bed.

Referring to FIGS. 14, 15A, and 15B, the rotational drive assembly 500 includes a rear drive assembly 517 mounted to the rear portion 324 of the frame 322 under the bed 321. The rear drive assembly 517 includes one or more idler sprockets 562 coupled to at least one drive shaft 564 rotatably mounted to the frame 322 under the bed 321. For illustrative purposes, the chains 550 and 560 are shown coupled to sprockets 562A and 562B, respectively. Also for illustrative purposes, the sprockets 562A and 562B are shown each coupled to a separate drive shaft 564A and 564B, respectively. However, this is not a requirement and embodiments in which the sprockets 562A and 562B are both coupled to single continuous drive shaft are within the scope of the present teachings.

As may best be viewed in FIGS. 15A and 15B, the sprocket 562A is aligned with the first chain guide channel 327 and configured to engage the first chain 450 (see FIG. 8). The sprocket 562B is aligned with the second chain guide channel 328 and configured to engage the first chain 460 (see FIG. 8). The chain 450 loops around the sprocket 562A and the chain 460 loops around the sprocket 562B.

Turning to FIG. 14, the drive shaft 564A is rotatably mounted to the frame 322 by a pair of spaced apart framing members 566A and 566B that are each coupled by their upper portions 567A and 567B, respectively, to the frame 322. Each of the framing members 566A and 566B includes a bearing assembly 568A and 568B, respectively, configured to house a portion of the drive shaft 564A and permit it to rotate relative to the frame 322. The drive shaft 564B is rotatably mounted to the frame 322 by a pair of spaced apart framing members 566C and 566D that are each coupled by their upper portions 567C and 567D, respectively, to the frame 322. Each of the framing members 566C and 566D includes a bearing assembly 568C and 568D, respectively, configured to house a portion of the drive shaft 564B and permit it to rotate relative to the frame 322.

In the embodiment depicted, the framing member 566A is adjacent the side portion 316 of the bed 321 and the framing member 566D is adjacent the side portion 317 of the bed 321. The framing member 566B is located between the sprocket 562A and the center channel 329. The framing member 566C is located between the sprocket 562B and the center channel 329. The bearing assemblies 568A and 568B rotatably retain the end portions of the drive shaft 564A, and the assemblies 568C and 568D rotatably retain the end portions of the drive shaft 564B.

Returning to FIGS. 11 and 12, as the motor 510 rotates the drive shaft 512, the sprockets 514A and 514B rotate and drive the chains 516A and 516B. The chains 516A and 516B in turn rotate the sprockets 532A and 532B, which cause the drive shaft 533 to rotate. Referring to FIG. 13, the rotating drive shaft 533 rotates the first and second sprockets 550 and 560. Depending upon the direction in which the motor 510 rotates the drive shaft 512, the sprockets 550 and 560 drive the upper run of the chains 450 and 460, respectively, either toward or away from the rear end portion 314 (see FIG. 7B) of the frame 322 relative to the surface 319 of the bed 321. Turning to FIGS. 14, 15A, and 15B, the first portions of the chains 550 and 560 travel in the chain guide channels 327 and 328, respectively, loop around the sprockets 562A and 562B, respectively, and cause the drive shafts 564A and 564B, respectively, to rotate (in the same direction). Referring to FIG. 10, the second portions of the chains 450 and 460 travel in the return chain guides 440 and 442, respectively, mounted to the frame 322 under the bed 321.

Returning to FIG. 11, the motor assembly 508 may be mounted to the bed 321 by a positioning assembly 570 configured to adjust the position of the motor assembly 508 (and thus the sprockets 514A and 514B) relative to the center channel 329 and/or the sprockets 532A and 532B to properly align the chains 516A and 516B, respectively, extending therebetween. In the embodiment depicted in FIG. 11, the positioning assembly 570 includes four threaded bolts 572 threadedly received into a base portion 576 mounted to the bed 321. The bolts 572 are terminated by a movable tray or plate 578 resting on the base portion 576, the plate 578 being slidable upon the base portion 576. One or more bolts (not shown) may be used to couple the plate 578 to slots (not shown) formed in the base portion 576. The slots may restrict the movement of the plate 578 relative to the base portion 576. The motor assembly 508 may be mounted to the plate 578 and the bolts 572 selectively turned (thereby advancing them toward or backing them away from the motor assembly 508) to adjust the positioning of the plate 578 and thereby the motor assembly 508 relative to the base portion 576.

In the second embodiment of the drive assembly 500, the motor assembly 508 (including motor 510, the drive shaft 512, the sprockets 514A and 514B coupled to the drive shaft 512, and the chains 516) is omitted. Further, referring to FIG. 20, the sprockets 532A and 532B are omitted from the front drive assembly 515. Thus, the front drive assembly 515 includes the drive shaft 533, the first and second sprockets 550 and 560, and the bearing assemblies 536A-536D. The front drive assembly 515 may not be driven directly by a motor. Instead, the front drive assembly 515 may be rotated by the chains 450 and 460 (see FIG. 8) in the same manner the rear drive assembly 517 is rotated by the chains 450 and 460 in the first embodiment. Alternatively, optional motors 539A and 539B may be coupled to opposite ends 537A and 537B, respectively, of the drive shaft 533 and configured to rotate the drive shaft to drive the chains 450 and 460 (see FIG. 8).

Figure 21:
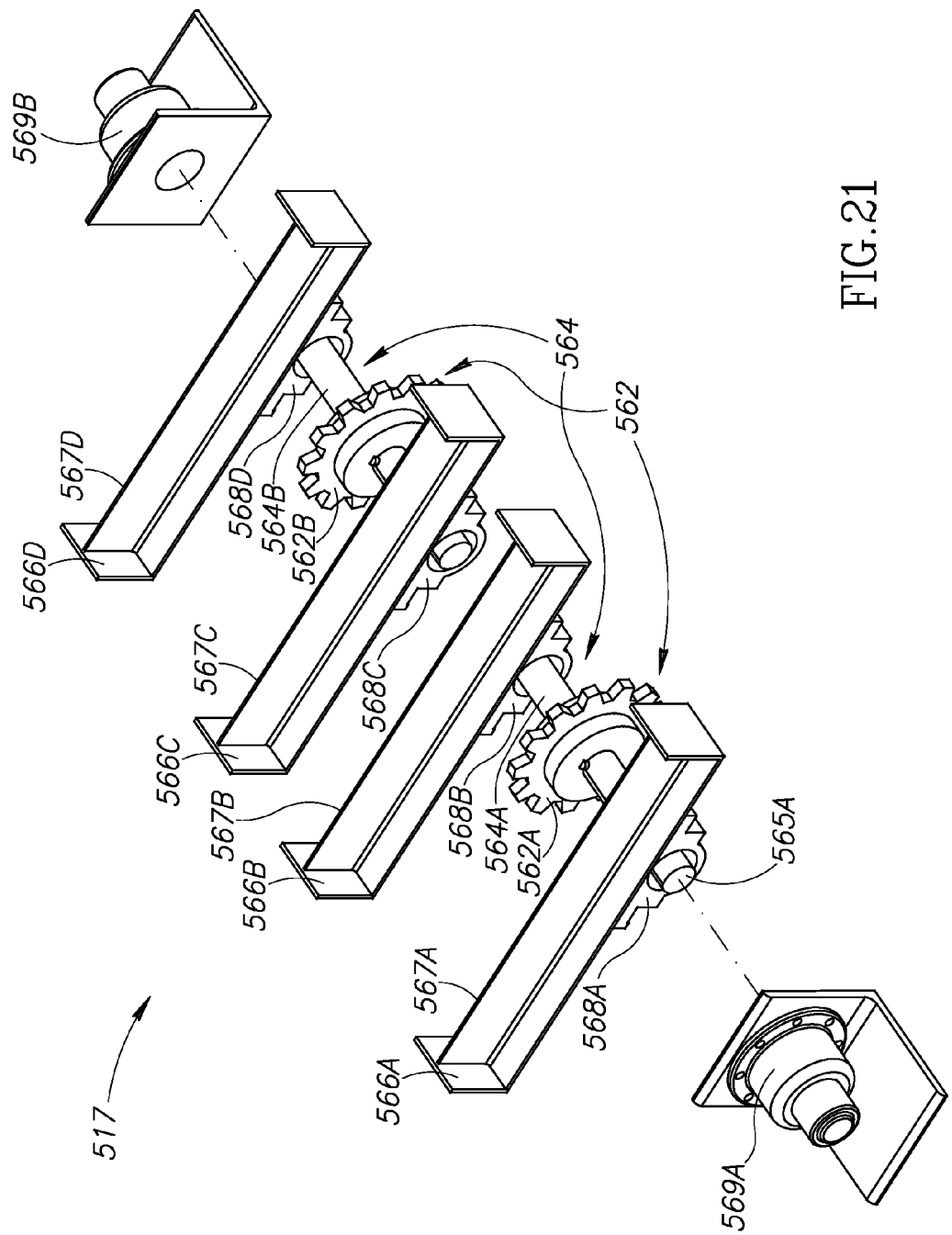
FIG. 21 is a perspective view of an alternate embodiment of a rear drive assembly to be located under the rear portion of the bed.

Referring to FIG. 21, in the second embodiment of the drive assembly 500, the rear drive assembly 517 includes the motors 569A and 569B. As mentioned above, the rear drive assembly 517 includes at least one drive shaft 564. In the drawings, the rear drive assembly 517 is illustrated as including two separate drive shafts 564A and 564B. The drive shaft 564A has an end portion 565A adjacent the side 306 (see FIG. 7B) of the frame 322 and the drive shaft 564B has an end portion 565B adjacent the side 307 (see FIG. 7C) of the frame 322. The motor 569A is mounted adjacently to the end portion 565A of the drive shaft 564A and coupled thereto by a gear box (not shown). The motor 569A rotates the drive shaft 564A to thereby rotate the sprocket 562A that in turn rotates the chain 450 (see FIG. 8). The rotating chain 450 (see FIG. 8) then rotates the sprocket 550, which rotates the drive shaft 533 (see FIG. 20). The motor 569B is mounted adjacently to the end portion 565B of the drive shaft 564B and coupled thereto by a gear box (not shown). The motor 569B rotates the drive shaft 564B to thereby rotate the sprocket 562B that in turn rotates the chain 460 (see FIG. 8). The rotating chain 460 (see FIG. 8) then rotates the sprocket 560, which rotates the drive shaft 533 (see FIG. 20). Returning to FIG. 20, in the second embodiment of the drive assembly 500, the drive shaft 533 may include two separate drive shafts (not shown) that are independently rotatable by the sprockets 550 and 560 and/or the motors 539A and 539B.

Referring to FIG. 7A, the cargo 90 may be loaded onto the forks 50A-50C using any material moving equipment, including forklifts. The cargo 90 may be loaded onto the forks 50A-50C via the side 306 and/or the side 307 (see FIG. 7D). One method of loading the cargo 90 into the apparatus 300 includes the use of an onsite auxiliary scale unit (not shown). The scale unit is configured to be loaded with the cargo 90 (e.g., pallets of goods). Then, the scale unit is operated to weight the cargo 90 loaded onto the scale unit. If the cargo 90 is too heavy, some may be removed from the scale unit. On the other hand, if the cargo 90 is too light, additional cargo may be added to the scale unit. Weighing the cargo 90 before loading it onto the apparatus 300, referred to as "pre-staging," may allow for more efficient loading of the trailer 125. While the apparatus 300 is busy loading cargo 90 into the trailer 125, the next load can be pre-staged. With appropriate cargo 90 handling equipment, an entire load of cargo can be transferred from the auxiliary scale unit to the bed 321 of the apparatus 300 for loading into the trailer 125. The auxiliary scale unit may be used instead of the scale unit described above.

Movable Carriage 600

Figure 16A:
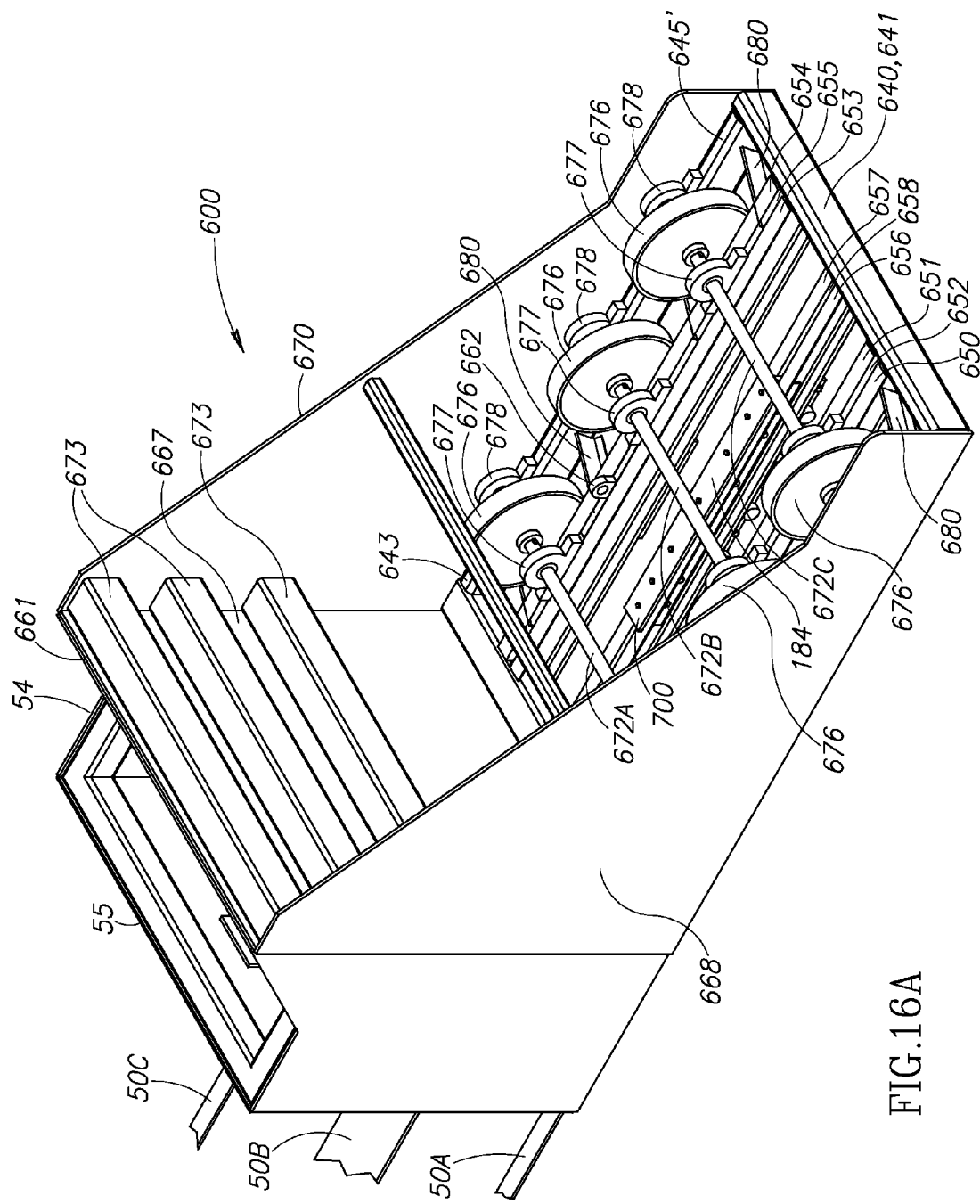
FIG. 16A is a perspective view of the carriage of the cargo loader apparatus of FIG. 7A taken from above the carriage.
Figure 16B:
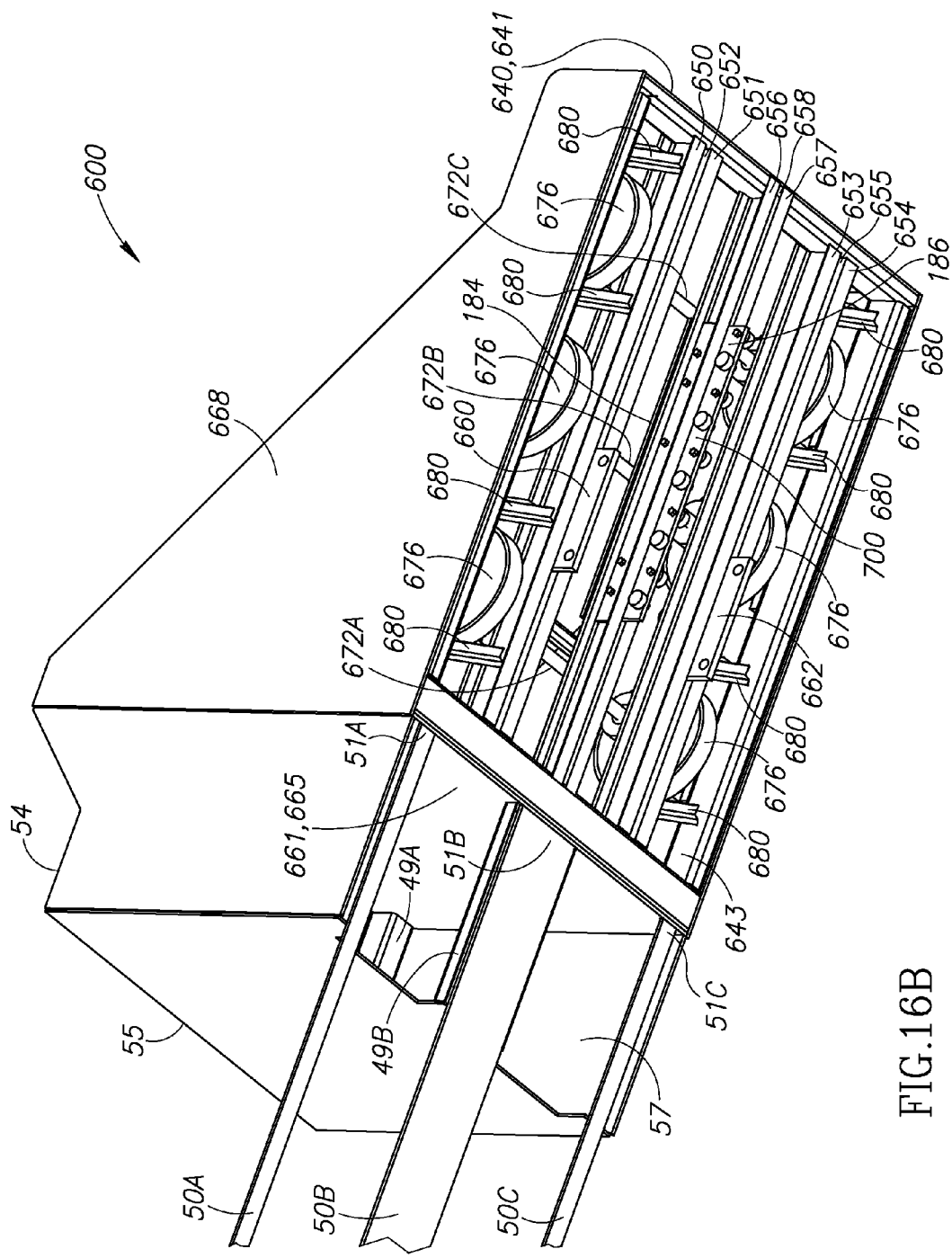
FIG. 16B is a perspective view of the carriage of the cargo loader apparatus of FIG. 7A taken from below the carriage.

Referring to FIGS. 8, 16A, and 16B, like the apparatus 10, the apparatus 300 includes a movable sled or carriage 600 mounted on the bed 321 configured to move forward and backward longitudinally over the bed 321 inside the passageway 358 (see FIG. 7C). FIGS. 7A, 7B, and 8 depict the carriage 600 in its rearmost position. FIGS. 7C, 7D, 15A, and 15B depict the carriage 600 in its forwardmost position. When the carriage 600 is in the forwardmost position depicted in FIGS. 7C, 7D, 15A, and 15B, the apparatus 300 is ready to receive the cargo 90 (see FIG. 7B).

Returning to FIGS. 8, 16A, and 16B, the carriage 600 includes a base portion 640 disposed on the bed 321. The base portion 640 has a front portion 641, a rear portion 643, and two opposing sides portions 645 and 645' substantially aligned longitudinally with the side portions 316 and 317, respectively, of the bed 321. The base portion 640 includes a first pair of laterally spaced apart rails 650 and 651, defining a first slot 652 therebetween longitudinally aligned with the first chain guide channel 327. The base portion 640 includes a second pair of laterally spaced apart rails 653 and 654, defining a second slot 655 therebetween longitudinally aligned with the second chain guide channel 328. The base portion 640 includes a third pair of laterally spaced apart rails 656 and 657, defining a third slot 658 therebetween longitudinally aligned with the center channel 329.

A first anchor assembly 660 coupled to the base portion 640 and disposed inside the first slot 652 extends from the base portion 640 through the first slot into the first chain guide channel 327 whereat the first anchor assembly 660 is coupled to the first chain 450 (see FIG. 8) in the first chain guide channel 327. A second anchor assembly 662 coupled to the base portion 640 and disposed inside the second slot 655 extends from the base portion 640 through the second slot into the second chain guide channel 328 whereat the second anchor assembly 662 is coupled to the second chain 460 (see FIG. 8) in the second chain guide channel 328. As the chains 450 and 460 are driven by the drive assembly 500, they pull the carriage 600, which is tethered to the chains 450 and 460 by the anchor assemblies 660 and 662, respectively, alternately forward and backward along the surface 319 of the bed 321.

The carriage 600 also includes a pair of spaced apart sidewalls 668 and 670, each mounted to one of the side portions 645 and 645', respectively, of the base portion 640, and a ram 661 extending between the sidewalls 668 and 670. The ram 661 is attached to the sidewalls 668 and 670 at a location adjacent to but spaced from the rear portion 643 of the base portion 640. The ram 661 includes a rearwardly facing surface 665 opposite a forwardly facing surface 667. Both of the surfaces 665 and 667 may be substantially perpendicular to the base portion 640; however, this is not a requirement. One or more supports 673 may be mounted to the forwardly facing surface 667 of the ram 661 and extend between the sidewalls 668 and 670. In the embodiment depicted in the figures, the forwardly facing surface 667 of the ram 661 is not coupled to the rear portion 643 of the base portion 640. One or more spacers or supports 669 may be mounted laterally between the sidewalls 668 and 670.

Like the ram surface 66 of the apparatus 10 (illustrated in FIGS. 1 and 2), the forks 50A-50C are coupled to by their proximal ends 51A-51C to the rearwardly facing surface 665 of the ram 661 and extend rearwardly therefrom. Further, the extension assembly 54 is attached to the carriage 600 adjacent the ram surface 665.

The carriage 600 includes longitudinally spaced apart transverse axles 672A-672C mounted to the base portion 640 between the sidewalls 668 and 670. Along each of the sidewalls 668 and 670, at least one wheel 676 is non-rotatably mounted to each end portion of the axles 672A-672C. The carriage 600 rolls along the bed 321 on the wheels 676, which support the base portion 640 of the carriage above the surface 319 of the bed 321. Each of the wheels 676 is flanked by a pair of bearings 677 and 678 mounted to the base portion 640 and housing a portion of the axles 672A, 672B, or 672C to which the wheel is coupled. The axles 672 and 674 rotate within the bearings 677 and 678 when the wheels 676 are rotated. In alternate embodiments, the wheels 676 may be rotatably coupled to the axles 672 and 674 by bearing assemblies (not shown). In such embodiments, the axles 672 and 674 are non-rotatably coupled to the base portion 640.

One or more scrapers 680 may be coupled to the base portion 640 of the carriage 600. The scrapers 680 may be configured to clear portions of the bed 321 along the path of travel of the wheels 676.

A traveler assembly 700, substantially similar to the traveler assembly 180 of the apparatus 10, is coupled to the base portion 640 and disposed inside the third slot 658. In the apparatus 300, the traveler assembly 700 may prevent the carriage 600 from being pulled sideways by one of the chains 450 and 460 to which the carriage is tethered.

Figure 17:
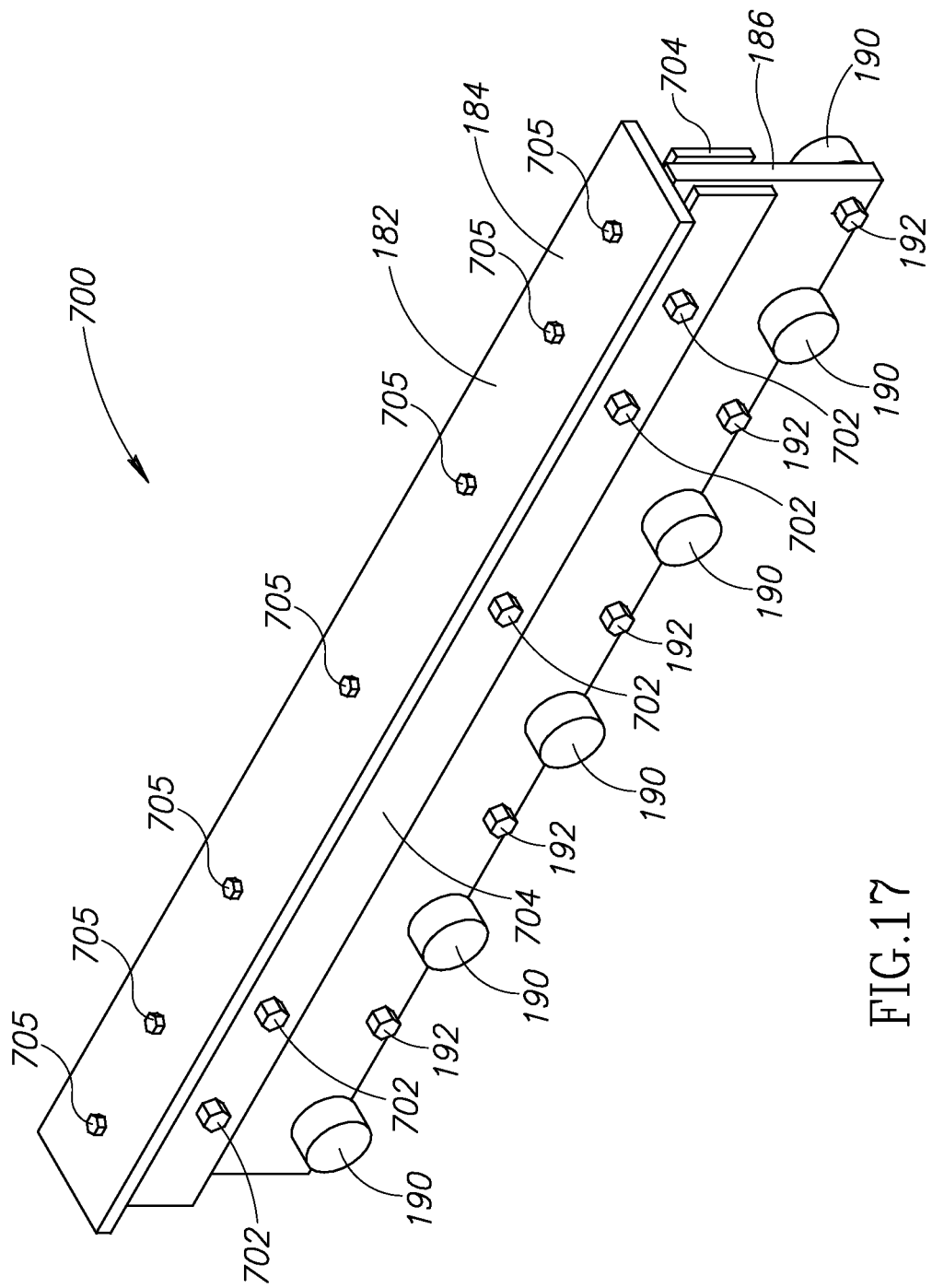
FIG. 17 is a perspective view of the traveler assembly of FIG. 6 as used with the cargo loader apparatus of FIG. 7A.

The traveler assembly 700 extends from the base portion 640 into the center channel 329 through the slot 310 (see FIG. 10) and into the chamber 313. Referring to FIG. 17, additional details related to the traveler assembly 700 will be described.

These details are equally applicable to the traveler assembly 180 described above. In FIG. 17, for illustrative purposes, both the carriage 600 and the bed 321 have been omitted. The traveler assembly 700 includes the T-shaped assembly 182 with a horizontal top plate 184 coupled to an upright center plate 186. The top plate 184 rests upon the rails 656 and 657 (see FIGS. 16A and 16B) and the upright center plate 186 extends into the third slot 658 between the rails 656 and 657. The upright center plate 186 is coupled to the rails 656 and 657 by fasteners 702, which extend laterally through the rails 656 and 657 and the upright center plate 186 positioned therebetween. An elongated plate 704 may be disposed along each of the rails 656 and 657 and the fasteners 702 may extend through the plates 704 into the rails 656 and 657 and through the center plate 186. The plates 704 may help distribute the forces experienced by the fasteners 702.

Attached to the lower end of the center plate 186 are several sets of support wheels 190 that extend from opposite faces of the center plate 186. Each of the support wheels 190 is coupled to the center plate 186 by a fastener 192. The top plate 184 may be coupled to the upright center plate 186 by one or more adjustable fasteners 705, such as bolt, configured to adjust the distance between the top plate 184 and the upright center plate 186. By adjusting (tightening or loosing) the adjustable fasteners 705, the distance the upright center plate 186 extends into the chamber 313 may be adjusted (tightened or loosened), such that the upright center plate 186 extends far enough into the chamber 313 to space the support wheels 190 an appropriate distance from the lower surfaces 308 and 309 of the flanges 303 and 305 (see FIG. 10) to allow the traveler assembly 700 to move within the center channel 329. For example, the adjustable fasteners 705 may be adjusted such that the support wheels 190 are in contact with the lower surfaces 308 and 309 of the flanges 303 and 305 and roll along the lower surfaces 308 and 309 when the carriage 600 is moving. Alternatively, the support wheels 190 may be positioned at least a predetermined distance from the lower surfaces 308 and 309 of the flanges 303 and 305. When the carriage 600 is moving across the bed 321, the wheels 190 may roll along and press against one or both of the lower surfaces 308 and 309 of the flanges 303 and 305 preventing the carriage from lifting up from the bed 321 while allowing the carriage to move longitudinally along the bed 321. While the traveler assembly 700 has been described as having support wheels 190, those of ordinary skill in the art appreciate that alternate follower elements or members may be used to travel along the lower surfaces 308 and 309 of the flanges 303 and 305, and such embodiments are within the scope of the present teachings.

The apparatus 300 includes the control center 48 (described above), which may optionally include the hydraulic pump 200 and the electric generator 202 mounted at the front section 326 of the frame 322. The hydraulic pump 200 and the electric generator 202 are connected to and power the trailer's four hydraulic legs 344, 344', 346, and 346' and the motor 510.

Hydraulic lines (not shown) and valves (not shown) connect the hydraulic legs 344, 344', 346, and 346' to the control center 48. Similarly, hydraulic lines (not shown) and valves (not shown) connect the hydraulic vertical supports 53 and 56 to the control center 48. p A sensor (e.g., an automatic limit switch) (not shown) may be coupled to the frame 322 near its rear end portion 314 and used to determine when the carriage 600 has reach a predetermined rearward stopping point. The sensor may be coupled to the control center 48, which includes an automatic shut-off or other stopping or braking mechanism. When the carriage 600 has been detected to have reached the predetermined rearward stopping point the rearward movement of the carriage 600 along the bed 321 is stopped.

A sensor (e.g., an automatic limit switch) (not shown) may be coupled to the frame 322 near its front end portion 312 and used to determine when the carriage 600 has reach a predetermined forward stopping point. The sensor may be coupled to the control center 48, which includes an automatic shut-off or other stopping or braking mechanism. When the carriage 600 has been detected to have reached the predetermined forward stopping point the forward movement of the carriage 600 along the bed 321 is stopped. In this manner, the carriage 600 may be prevented from colliding with the drive assembly 500.

In embodiments including the first embodiment of the drive assembly 500, the control center 48 includes manual controls allowing an operator to activate the motor 510 and determine the direction of travel of the carriage 600 by determining the direction of rotation of the drive shaft 512 of the motor 510 (see FIG. 11). For example, the controls may include a forward motor control and reverse motor control. The controls may also include a speed control for controlling the speed of the motor 510. Further, the controls may include a motor start, motor stop, and jog control.

In embodiments including the second embodiment of the drive assembly 500, the control center 48 includes manual controls allowing an operator to activate the motors 569A and 569B and determine the direction of travel of the carriage 600 by determining the direction of rotation of the drive shafts 564A and 564B by the motors 569A and 569B, respectively. For example, the controls may include a forward motor control and a reverse motor control for each of the motors 569A and 569B. The controls may also include speed controls for controlling the speeds of the motors 569A and 569B. These controls may be used to ensure the chains 450 and 460 are rotated at the same rate. Further, the controls may include a motor start, motor stop, and jog control for each of the motors 569A and 569B. Optionally, the controls may include similar controls for controlling the operation of the motors 539A and 539B.

The control center 48 may include the scale unit and its display. In embodiments in which the frame 322 is incorporated in trailer 320, the control center 48 may also include manually operated controls for lowering and raising the hydraulic legs 344, 344', 346, and 346'.

Methods

Figure 18:
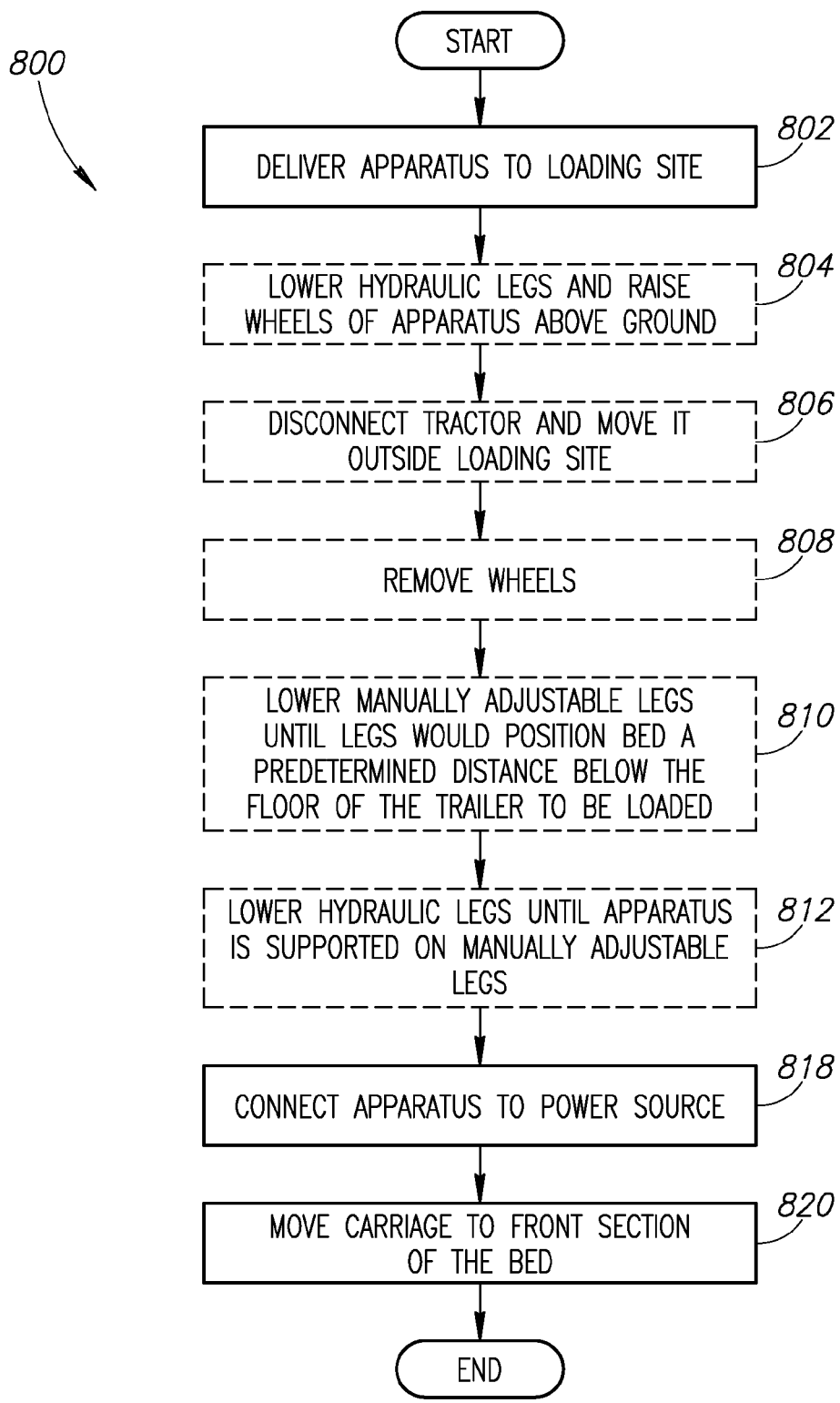
FIG. 18 is a flow diagram of a method of setting up the cargo loader apparatuses of FIGS. 1 and 7A.

FIG. 18, is a flow diagram of a method 800, which may be performed to set up the apparatus 10 and/or apparatus 300 at a loading site. For illustrative purposes only, it will be assumed the method 800 is being performed with respect to the apparatus 300. At block 802, the apparatus 300 is delivered to a relatively flat loading site. For example, the apparatus 300 may be positioned on a level concrete, asphalt or compacted base surface. In embodiments in which the frame 322 is incorporated in the trailer 320, the trailer 320 may be pulled to the loading site by a tractor.

Blocks 804-812 apply to implementations in which the frame 322 is incorporated into trailer 320. In such embodiments, as appropriate, blocking may be placed under hydraulic legs 344, 344', 346, and 346' for stability. Then, at block 804, the hydraulic legs 344, 344', 346, and 346' are lowered and the trailer 320 raised sufficiently high to remove the wheels from the wheel and axel assemblies 337A-337C. In next block 806, the tractor is disconnected from the apparatus 300 and moved away from the area of operation. In next block 808, the wheels are dismounted from the wheel and axel assemblies 337A-337C of the apparatus 300 and moved away from the area of operation. To remove the wheels from the wheel and axel assemblies 337A-337C, dollies may be slid under the wheels. Then, air lines are disconnected and wheel locking pins are removed from the wheels of the wheel and axel assemblies 337A-337C. In next block 810, the manually adjustable support legs 338, 338', 340, and 340' may be adjusted to a length that if disposed on the ground would place the bed 321 a predetermined distance (e.g., between approximately 4 inches and approximately 6 inches) lower than the expected height of the floor 129 of the trailer 125. Then, at block 812, the length of the hydraulic legs 344, 344', 346, and 346' is shorted such that the apparatus 300 is supported by the manually adjustable support legs 338, 338', 340, and 340'.

In block 818, the apparatus 300 is connected to an electrical power source and the main electrical disconnect is switched into an "ON" position. If necessary, in block 820, from the control station, the operator moves the carriage 600 to the front section 326 of the frame 322. In other words, the ram 661 is positioned in the retracted cargo loading position illustrated in FIGS. 7C and 7D thereby positioning the forks 50A-50C on the bed 321 within the passageway 358 (see FIG. 7C). At this point, the method 800 terminates and the apparatus 300 performing the method is ready for use.

Figure 19:
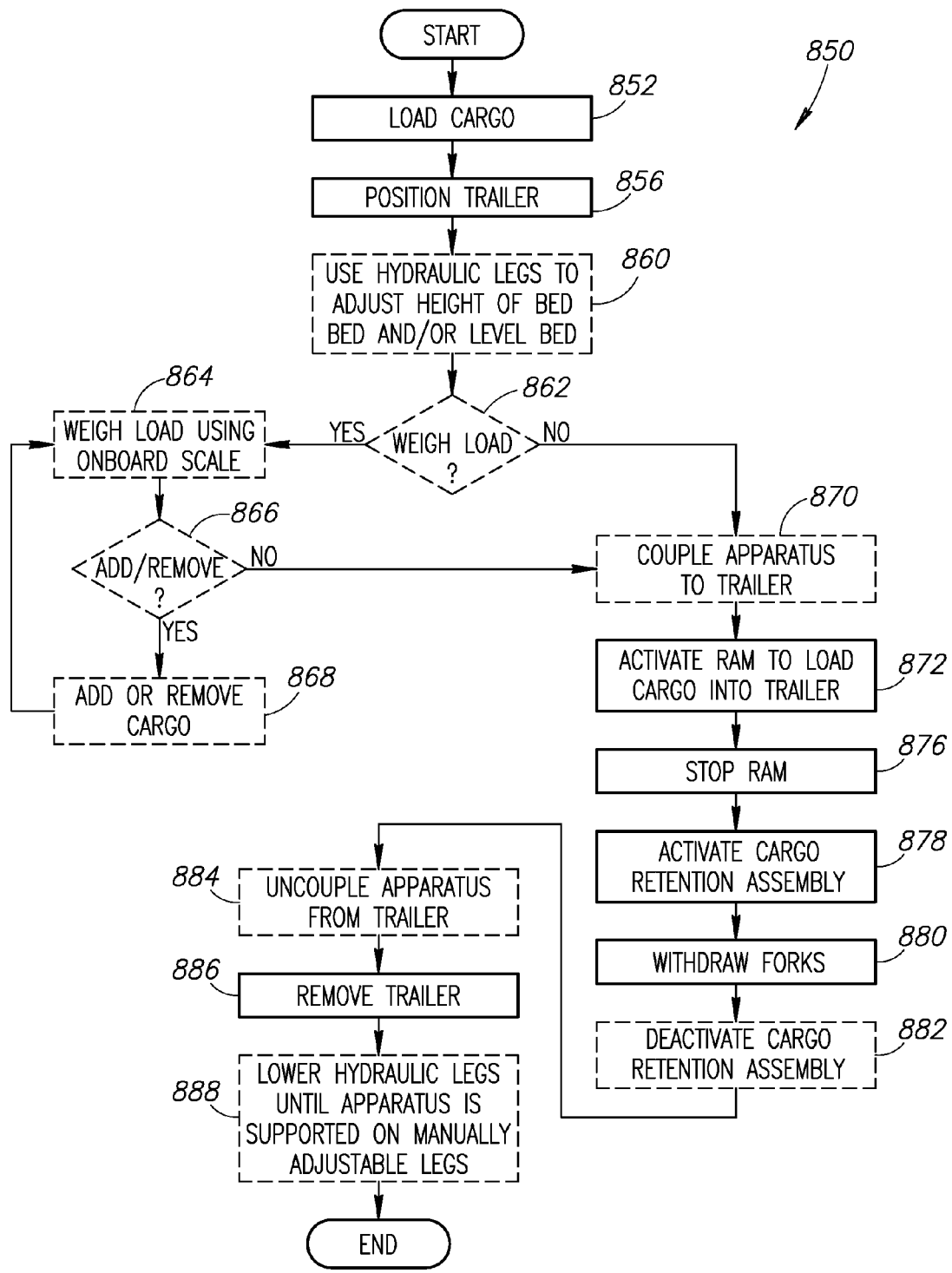
FIG. 19 is a flow diagram of a method performable at least in part by the cargo loader apparatuses of FIGS. 1 and 7A.

FIG. 19 is a flow diagram of a method 850, which may be performed by the apparatus 10 and/or apparatus 300 at the loading site. For illustrative purposes only, it will be assumed that only the apparatus 300 is performing portions of the method 850. In block 852, the cargo 90 (e.g., pallets supporting goods) is loaded onto the forks 50A-50C when the forks 50A-50C are positioned within the passageway 358 (see FIG. 7C).

In next block 856, the trailer 125 is positioned relative to the apparatus 300. A trailer positioning and guidance mechanism (not shown) may be placed in a staging area and used to aid the truck operator in properly aligning the trailer 125 with the apparatus 300 when backing the trailer 125 up to the rear end portion 314 of the frame 322 of the apparatus 300. Additionally, onsite personnel may monitor and assist the truck operator back the trailer 125 up to the rear end portion 314 of the frame 322. To minimize or avoid damage to the trailer 125 and/or the apparatus 300, the trailer 125 should be properly aligned with the apparatus 300.

In embodiments in which the frame 322 is incorporated into the trailer 320, in optional next block 860, if necessary, the four hydraulic legs 344, 344', 346, and 346' on the trailer 320 are then used to adjust the height of the bed 321 to be substantially equal to the height of the floor 129 (see FIG. 7B) of the trailer 125. The four hydraulic legs 344, 344', 346, and 346' may also be used to level the bed 321 of the apparatus 300.

Next, in optional decision block 862, a decision is made whether to weight the load using the scale unit. If an auxiliary scale unit was used to pre-state the cargo, use of the scale unit may not be necessary. As discussed above, the cargo 90 may be pre-staged while the apparatus 300 is in use. If the decision in block 862 is "NO," the method 850 advances to block 870, If the decision in block 862 is "YES," in block 864, the onboard scale unit is used to weigh the load. At decision block 866, a decision is made whether to add cargo to or remove cargo from the load. For example, if the load is too heavy because it fails to satisfy load limits and thus, is illegal, the decision in block 866 is "YES." Similarly, if the load is too under weight, the decision in block 866 is also "YES." In block 868, cargo is added or removed as necessary or desired.

After cargo is added to or removed from the load, the method 850 returns to block 864 and the load is weighed again.

If the decision in block 866 is "NO," the method 850 advances to optional block 870. In optional block 870, the rear end portion 226 of the trailer 125 is connected or coupled to the rear end portion 314 of the frame 322. This connection may help prevent damage to both the trailer 125 and the apparatus 300 during the loading operation. The frame 322 may be coupled or bound to the rear portion 126 of the trailer 125 with binding chains.

In block 872, the operator activates the rotational drive assembly 500 to move the carriage 600 rearwardly over the bed 321. As the carriage 600 moves rearward, the forks 50A-50C carry the cargo 90 along the bed 321 within the passageway 358 into the opening 128 of the trailer 125. The drive assembly 500 may propel the carriage 600 rearward over the bed 321 at a rate of about one (1) foot per second. As the forks 50A-50C are carrying the cargo 90 into the trailer 125, it may be desirable to monitor the apparatus 300 and trailer 125 for potential problems.

At block 876, the rearward travel of the forks 50A-50C are halted. In particular embodiments, when the carriage 600 reaches its rearmost position along the bed 321, the automatic limit switch shuts down the drive assembly 500 and stops the carriage 600.

At block 878, the cargo retention assembly 60 is activated. As discussed above, this may occur automatically when the carriage 600 has reached its rearmost position along the bed 321. As discussed above with respect to the apparatus 10, the retention mechanisms 62A and 62B are positioned in the lowered/retracted position (see FIGS. 7B and 15B) and stored below the upper surface 319 of the bed 321 when cargo 90 is loaded onto the forks 50A-50C and the forks are moved rearwardly along the bed 321 to load the cargo into the trailer 125. FIG. 7B illustrates the apparatus 300 after the forks 50A-50C have been fully received inside the trailer 125 but before the cargo retention assembly 60 has been activated.

When the cargo retention assembly 60 is activated, the retention mechanisms 62A and 62B are raised by the positioning assembly 59 to the raised/retracted position (see FIG. 23B). In the embodiment illustrated, the retention mechanisms 62A and 62B may be at least partially received inside the hollow lower portion 57 and/or the lower cutout portions 56A and 56B, respectively, of the extension assembly 54. Then, the retention mechanisms 62A and 62B are positioned in the raised/extended position (see FIG. 23C) whereat the engagement members 95 are brought into engagement with the cargo 90 inside the trailer 125. In other words, referring to FIG. 8, the hydraulic cylinders 86A and 86B of the cargo engagement assemblies 63 push the engagement members 95 into engagement with the cargo 90 inside the trailer 125. If the retention mechanisms 62A and 62B are within the hollow lower portion 57, the engagement member 95 may exit therefrom via the lower cutout portions 56A and 56B, respectively. FIG. 8 illustrate the apparatus 300 after the forks 50A-50C have been fully received inside the trailer 125 and after the cargo retention assembly 60 has been activated.

Next, in block 880, the forks 50A-50C (see FIG. 2) are withdrawn from inside the trailer 125 by moving the carriage 600 forward along the bed 321. If desired, the drive assembly 500 may be reversed by pressing a reverse button at the control station. It may be desirable to monitor the carriage 600 until the forks 50A-50C are fully retracted to within the passageway 538 and the ram 661 is in the cargo loading position (depicted in FIG. 7C). The hydraulic cylinders 86A and 86B hold the engagement members 95 in engagement with the cargo 90 (see FIG. 7B) inside the trailer 125 to maintain the cargo inside the trailer 125, which causes the cargo to drop off the distal ends 52A-52C of the forks 50A-50C and onto the floor 129 of the trailer 125 as the forks are withdrawn. FIGS. 7C, 7D, and 15B illustrate the apparatus 300 after the forks 50A-50C have been fully retracted from inside the trailer 125 and before the cargo retention assembly 60 is deactivated.

Optionally, in block 882, the cargo retention assembly 60 is deactivated. In this block, the retention mechanisms 62A and 62B are positioned in the lowered/retracted position (see FIG. 15B) and stored below the upper surface 319 of the bed 321. FIG. 15B illustrates the apparatus 300 after the forks 50A-50C have been fully retracted from inside the trailer 125 and the cargo retention assembly 60 has been deactivated.

Then, in optional block 884, if the rear portion 126 of the trailer 125 was connected from the rear end portion 314 of the frame 322 in optional block 870, the rear portion 126 of the trailer 125 is disconnected from the rear end portion 314 of the frame 322. If the frame 322 was bound to the rear portion 126 of the trailer 125 with binding chains, the binding chains are disconnected and optionally stored for use with another trailer.

At this point, in block 886, the trailer 125 may be removed from the loading site. The operator may instruct the truck operator to pull the trailer 125 away from the loading site.

In embodiments in which the frame 322 is incorporated into the trailer 320, after the trailer 125 has left the loading area, in optional block 888, the hydraulic legs 344, 344', 346, and 346' may be used to lower the apparatus 300 to rest upon the manually adjustable support legs 338, 338', 340, and 340' in preparation for the next load operation.

Once the trailer 125 has received the cargo 90, the trailer 125 may be transported to a final destination.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cargo loader apparatus for use with a cargo, the apparatus comprising:
    an elongated passageway at least partially defined along an upper surface of an elongated bed, the passageway having an open end;
    a movable carriage configured to travel back and forth within the passageway between a cargo receiving position and a cargo loading position, the cargo loading position being adjacent the open end of the elongated passageway;
    a plurality of cargo receiving members coupled to the carriage to move therewith, the cargo receiving members extending outwardly from the carriage and being positioned within the passageway when the carriage is in the cargo receiving position, the cargo receiving members extending outside the passageway through and beyond the open end of the passageway and supporting the cargo thereon when the carriage is in the cargo loading position, the cargo receiving members being configured to receive the cargo when in the cargo receiving position inside the passageway and to carry the cargo as the cargo receiving members are moved by the carriage to extend outside the passageway through and beyond the open end of the passageway to thereby position the cargo outside the passageway when the carriage is in the cargo loading position;
    a cargo removing assembly configured to block the cargo from being carried by the cargo receiving members back into the passageway when the carriage is moved from the cargo loading position to the cargo receiving position to thereby remove the cargo from the cargo receiving members as the cargo receiving members are moved back into the passageway, the cargo removing assembly comprising a positioning assembly, a retention mechanism, and a cargo engaging portion, the positioning assembly being movable between a storage position and an engagement position relative to the upper surface of the bed, the retention mechanism being configured to be positioned by the positioning assembly, the positioning assembly positioning an upper portion of the retention mechanism in a raised position above the upper surface of the bed for engagement with the cargo when the positioning assembly is in the engagement position, and the positioning assembly positioning the retention mechanism at a sufficiently lower position so as not to engage the cargo when the positioning assembly is in the storage position; and
    an extension assembly movably coupled to the carriage to move therewith, the extension assembly being adjacent the cargo receiving members and positioned to be adjacent to the cargo removing assembly when the carriage is in the cargo loading position, the extension assembly having a hollow lower portion with at least one aperture formed therein, the hollow lower portion being configured to receive the upper portion of the retention mechanism positioned above the upper surface of the bed when the positioning assembly is in the engagement position, the cargo engaging portion being extendable outwardly from the hollow lower portion through the at least one aperture to engage the cargo when the positioning assembly is in the engagement position.

2. The apparatus of claim 1, wherein the cargo removing assembly is positioned adjacent to the open end of the passageway.

3. The apparatus of claim 1, wherein the upper portion of the retention mechanism is configured to be positioned between two adjacent cargo receiving members when the positioning assembly is in the engagement position.

4. The apparatus of claim 1, wherein the cargo removing assembly further comprises a housing at least partially disposed inside the hollow lower portion of the extension assembly when the positioning assembly is in the engagement position, and
    the cargo engaging portion comprises a cargo engagement surface movably coupled to the housing by one or more movement mechanisms configured to selectively move the cargo engagement surface into and out of engagement with the cargo.

5. The apparatus of claim 1, wherein the extension assembly is at least partially supported by the cargo receiving members and the at least one aperture formed in the hollow lower portion of the extension assembly is positioned between two adjacent cargo receiving members.

6. The apparatus of claim 1, wherein the cargo removing assembly comprises a cargo pushing assembly that includes the cargo engaging portion, and the cargo pushing assembly pushes the cargo away from the carriage.

7. The apparatus of claim 1, wherein the cargo engaging portion is selectively positionable between the cargo receiving members to engage the cargo.

8. The apparatus of claim 7, wherein the cargo removing assembly has an extension portion connected to the cargo engaging portion, and
    the extension portion is configured to be extended to position the cargo engaging portion into engagement with the cargo.

9. The apparatus of claim 1, further comprising:
    a movable trailer comprising the elongated bed having the upper surface.

10. The apparatus of claim 1, further comprising:
    a stationary frame, the elongated bed with the upper surface being mounted on the stationary frame.

11. The apparatus of claim 1 for use with a movable trailer having an elongated cargo receiving area having a length and an open end portion positioned adjacent the open end of the elongated passageway, wherein the plurality of cargo receiving members are at least as long as the length of the elongated cargo receiving area of the movable trailer.

12. The apparatus of claim 1 for use with a movable trailer having an elongated cargo receiving area having an open rear end portion positioned adjacent the open end of the elongated passageway and a front end portion opposite the open rear end portion, wherein the plurality of cargo receiving members extend through the open rear end portion to the front end portion when the carriage is in the cargo loading position.

13. The apparatus of claim 1, wherein the plurality of cargo receiving members are each an elongated fork coupled by a first end to the carriage.

14. A pallet loader for use with a trailer to be loaded with a plurality of pallets of cargo, the pallet loader comprising:
   a support frame;
   a bed supported by the support frame, the bed comprising an upper surface;
   a pair of drive chains movably coupled to the support frame, each drive chain comprising a continuous loop, the continuous loop being selectively rotatable relative to the bed in a first direction and a second direction opposite the first direction, as each continuous loop of drive chain rotates, a first portion of the continuous loop is located adjacent to the bed, and a second portion of the continuous loop is located under the bed;
   a drive assembly coupled to the continuous loops of the pair of drive chains and configured to selectively rotate the continuous loops in the first direction and the second direction, the first direction moving the first portion of the drive chains toward the trailer, the second direction moving the first portion of the drive chains away from the trailer;
   a plurality of movable forks configured to receive and support the plurality of pallets, the forks being positioned on the bed and tethered to the first portions of the continuous loops of the pair of drive chains, the drive chains being configured to pull the forks and the plurality of pallets supported thereby in the first direction and into the trailer, and to pull the forks in the second direction and out of the trailer; and
   a cargo engagement assembly configured to engage a portion of the plurality of pallets or the cargo thereon when the forks are supporting the plurality of pallets inside the trailer and to prevent the plurality of pallets from being carried by the forks out of the trailer as the forks are pulled in the second direction by the drive chains, the cargo engagement assembly comprising a positioning assembly and a retention mechanism, the positioning assembly being movable between a storage position and an engagement position relative to the upper surface of the bed, the retention mechanism being configured to be positioned by the positioning assembly, the positioning assembly positioning an upper portion of the retention mechanism in a raised position above the upper surface of the bed for engagement with the portion of the plurality of pallets or the cargo thereon when the positioning assembly is in the engagement position, and the positioning assembly positioning the retention mechanism at a sufficiently lower position so as not to engage the portion of the plurality of pallets or the cargo thereon when the positioning assembly is in the storage position.

15. The pallet loader of claim 14, wherein the plurality of movable forks comprises a central fork positioned between a first side fork and a second side fork.

16. The pallet loader of claim 15, wherein the central fork is wider than the first and second side forks.

17. The pallet loader of claim 14, wherein the plurality of movable forks are each substantially planar.

18. The pallet loader of claim 14 for use with a trailer having a floor, wherein the frame is supported by a plurality of height adjustable mechanisms configured to position the bed such that its upper surface is substantially coplanar with the floor inside the trailer.

19. The apparatus of claim 14, wherein the upper portion of the retention mechanism is configured to be positioned between two adjacent forks when the positioning assembly is in the engagement position.

20. The apparatus of claim 14, wherein the cargo engagement assembly further comprises a cargo engaging portion configured to be selectively extended outwardly from the upper portion of the retention mechanism to engage the portion of the plurality of pallets or the cargo thereon.

21. The apparatus of claim 20, wherein the cargo engagement assembly further comprises a housing, and the cargo engaging portion comprises a cargo engagement surface movably coupled to the housing by one or more movement mechanisms configured to selectively move the cargo engagement surface into and out of engagement with the portion of the plurality of pallets or the cargo thereon.

* * * * *